United States Patent
Maes

(10) Patent No.: US 8,365,306 B2
(45) Date of Patent: Jan. 29, 2013

(54) PLATFORM AND SERVICE FOR MANAGEMENT AND MULTI-CHANNEL DELIVERY OF MULTI-TYPES OF CONTENTS

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1107 days.

(21) Appl. No.: 11/138,844

(22) Filed: May 25, 2005

(65) Prior Publication Data

US 2006/0272028 A1    Nov. 30, 2006

(51) Int. Cl.
G06F 7/04 (2006.01)
G06F 21/00 (2006.01)
G06F 17/30 (2006.01)
G06F 15/16 (2006.01)
H04L 29/06 (2006.01)

(52) U.S. Cl. .................. 726/30; 726/6; 726/27; 726/28; 726/29; 713/153; 705/51; 705/52; 705/53; 705/63; 705/77; 705/78; 705/79

(58) Field of Classification Search ................ 726/6, 27, 726/28, 29, 30; 713/153; 705/51, 52, 53, 705/63, 77–79

See application file for complete search history.

(56) References Cited

U.S. PATENT DOCUMENTS

| 4,996,642 | A | 2/1991 | Hey |
| 6,240,401 | B1 | 5/2001 | Oren et al. |
| 6,308,328 | B1 | 10/2001 | Bowcutt et al. |
| 6,334,127 | B1 | 12/2001 | Bieganski et al. |
| 6,436,579 | B1 | 8/2002 | Gutkin |
| 6,438,579 | B1 * | 8/2002 | Hosken ........................ 709/203 |
| 6,546,555 | B1 | 4/2003 | Hjelsvoid et al. |
| 6,567,657 | B1 | 5/2003 | Holly et al. |
| 6,601,061 | B1 * | 7/2003 | Holt et al. ............................. 1/1 |
| 6,665,659 | B1 | 12/2003 | Logan |
| 6,732,366 | B1 | 5/2004 | Russo |

(Continued)

FOREIGN PATENT DOCUMENTS

WO    2005006228 A2    1/2005

OTHER PUBLICATIONS

Karjoth, Gunter. "Access Control with IBM Tivoli Access Manager", 2003 ACM.*

(Continued)

*Primary Examiner* — Michael Simitoski
(74) *Attorney, Agent, or Firm* — Kilpatrick Townsend & Stockton LLP

(57) ABSTRACT

A platform for managing delivery of content originating from one or more content providers to users is provided. The platform includes a portal that is configured to support access through a plurality of access channels configured to receive requests through one or more access channels. A request for content is received from an access device through an access channel. An identity management module is configured to determine a user associated with the message. A content manager is configured to manage content for delivery through the plurality of access channels and configured to determine eligible content for the user. A billing module is configured to process billing for the user and content provider based on the content provided to the user. The content manager is then configured to deliver the requested content to the user's access device through the access channel.

34 Claims, 13 Drawing Sheets

U.S. PATENT DOCUMENTS

| | | | |
|---|---|---|---|
| 6,769,127 B1 | 7/2004 | Bonomi et al. | |
| 6,847,969 B1 | 1/2005 | Mathai et al. | |
| 6,854,010 B1 | 2/2005 | Christian et al. | |
| 6,892,228 B1 | 5/2005 | Penders | |
| 7,149,797 B1 | 12/2006 | Weller et al. | |
| 7,181,523 B2 | 2/2007 | Sim | |
| 7,197,570 B2 | 3/2007 | Eylon et al. | |
| 7,233,790 B2* | 6/2007 | Kjellberg et al. | 455/419 |
| 7,272,651 B1 | 9/2007 | Bolding et al. | |
| 7,360,210 B1* | 4/2008 | Vacanti et al. | 717/171 |
| 7,363,384 B2* | 4/2008 | Chatani et al. | 709/232 |
| 7,366,495 B1 | 4/2008 | Magnotta et al. | |
| 7,386,623 B2 | 6/2008 | Nishimura et al. | |
| 7,783,635 B2 | 8/2010 | Maes | |
| 7,917,612 B2 | 3/2011 | Maes | |
| 2001/0027558 A1 | 10/2001 | Sasselli et al. | |
| 2002/0022453 A1* | 2/2002 | Balog et al. | 455/41 |
| 2002/0042923 A1* | 4/2002 | Asmussen et al. | 725/92 |
| 2002/0056126 A1 | 5/2002 | Srikantan et al. | |
| 2002/0083124 A1 | 6/2002 | Knox et al. | |
| 2002/0116291 A1 | 8/2002 | Grasso et al. | |
| 2002/0124182 A1 | 9/2002 | Bacso et al. | |
| 2002/0128984 A1 | 9/2002 | Mehta et al. | |
| 2002/0143565 A1 | 10/2002 | Headings et al. | |
| 2002/0152224 A1 | 10/2002 | Roth et al. | |
| 2002/0152305 A1 | 10/2002 | Jackson et al. | |
| 2002/0184195 A1 | 12/2002 | Qian | |
| 2002/0194251 A1 | 12/2002 | Richter et al. | |
| 2003/0028890 A1 | 2/2003 | Swart et al. | |
| 2003/0061611 A1* | 3/2003 | Pendakur | 725/46 |
| 2003/0093341 A1* | 5/2003 | Millard et al. | 705/34 |
| 2003/0093799 A1 | 5/2003 | Kauffman et al. | |
| 2003/0145333 A1* | 7/2003 | Hjelsvold et al. | 725/113 |
| 2003/0154487 A1 | 8/2003 | Tsumura | |
| 2003/0187794 A1 | 10/2003 | Irwin et al. | |
| 2003/0233241 A1 | 12/2003 | Marsh | |
| 2003/0236745 A1 | 12/2003 | Hartsell et al. | |
| 2003/0236905 A1 | 12/2003 | Choi et al. | |
| 2004/0008688 A1* | 1/2004 | Matsubara et al. | 370/395.21 |
| 2004/0025186 A1 | 2/2004 | Jennings et al. | |
| 2004/0028055 A1 | 2/2004 | Madour et al. | |
| 2004/0044677 A1 | 3/2004 | Huper-Graff et al. | |
| 2004/0064579 A1 | 4/2004 | Jennings | |
| 2004/0102182 A1 | 5/2004 | Reith et al. | |
| 2004/0117500 A1 | 6/2004 | Lindholm et al. | |
| 2004/0117836 A1 | 6/2004 | Karaoguz et al. | |
| 2004/0133923 A1 | 7/2004 | Watson et al. | |
| 2004/0167791 A1 | 8/2004 | Rodrigo et al. | |
| 2004/0192253 A1 | 9/2004 | Usumi | |
| 2004/0205043 A1 | 10/2004 | Alessi et al. | |
| 2004/0267812 A1 | 12/2004 | Harris et al. | |
| 2005/0009500 A1 | 1/2005 | Ear | |
| 2005/0009541 A1* | 1/2005 | Ye et al. | 455/466 |
| 2005/0021765 A1* | 1/2005 | Flores et al. | 709/228 |
| 2005/0022229 A1* | 1/2005 | Gabriel et al. | 725/28 |
| 2005/0064875 A1 | 3/2005 | Gonsalves et al. | |
| 2005/0076365 A1 | 4/2005 | Popov et al. | |
| 2005/0154764 A1 | 7/2005 | Riegler et al. | |
| 2005/0198332 A1* | 9/2005 | Laertz et al. | 709/229 |
| 2005/0246282 A1 | 11/2005 | Naslund et al. | |
| 2005/0283791 A1 | 12/2005 | McCarthy et al. | |
| 2006/0090187 A1 | 4/2006 | Chae et al. | |
| 2006/0100987 A1 | 5/2006 | Leurs | |
| 2006/0111077 A1 | 5/2006 | Hurtta | |
| 2006/0141984 A1 | 6/2006 | Taglienti et al. | |
| 2006/0153160 A1 | 7/2006 | Kalland | |
| 2006/0168288 A1 | 7/2006 | Covell et al. | |
| 2006/0206617 A1 | 9/2006 | Rey et al. | |
| 2006/0230124 A1 | 10/2006 | Belfiore et al. | |
| 2006/0242038 A1 | 10/2006 | Giudilli | |
| 2006/0271488 A1 | 11/2006 | Maes | |
| 2006/0271548 A1 | 11/2006 | Maes | |
| 2006/0272031 A1* | 11/2006 | Ache et al. | 726/28 |
| 2007/0297340 A1 | 12/2007 | Maes | |
| 2008/0215704 A1 | 9/2008 | Curcio et al. | |

OTHER PUBLICATIONS

Kallio, Paivi et al. "Accounting and Billing of Wireless Internet Services in the Third Generation Networks", 2003.*

Kuo, Y.-F. et al., "Personalization technology application to Internet content provider," *Expert Systems with Applications*, 2001, vol. 21, pp. 203-215.

Schulzrinne, H. et al., "Real Time Streaming Protocol (RTSP)," Network Working Group, Request for Comments: 2326, Category: Standards Track, Apr. 1998, 115 pages.

Author Unknown, "Using RTSP With Firewalls, Proxies, and Other Intermediary Network Devices", Version 2.0/rev. 2, 1998, http://docs.real.com/docs/proxykit/rtspd.pdf, 16 pages.

Boll, Susanne, "Modular Content Personalization Service Architecture for E-Commerce Applications", Proceedings of the 4th IEEE International Workshop on Advanced Issues of E-Commerce and Web-Based Information Systems, 2002, 8 pages.

U.S. Appl. No. 11/137,969, filed May 25, 2005, Advisory Action dated Mar. 4, 2010, 3 pages.

U.S. Appl. No. 11/137,969, filed May 25, 2005, Advisory Action dated Apr. 16, 2009, 4 pages.

U.S. Appl. No. 11/137,969, filed May 25, 2005, Final Office Action dated Dec. 24, 2009, 23 pages.

U.S. Appl. No. 11/137,969, filed May 25, 2005, Final Office Action dated Feb. 11, 2009, 21 pages.

U.S. Appl. No. 11/137,969, filed May 25, 2005, Final Office Action dated Mar. 5, 2008, 17 pages.

U.S. Appl. No. 11/137,969, filed May 25, 2005, Notice of Allowance dated Apr. 15, 2010, 16 pages.

U.S. Appl. No. 11/137,969, filed May 25, 2005, Office Action dated Jul. 14, 2009, 27 pages.

U.S. Appl. No. 11/137,969, filed May 25, 2005, Office Action dated Aug. 29, 2007, 13 pages.

U.S. Appl. No. 11/137,969, filed May 25, 2005, Office Action dated Aug. 5, 2008, 20 pages.

U.S. Appl. No. 11/138,546, filed May 25, 2005, Final Office Action dated Aug. 19, 2009, 35 pages.

U.S. Appl. No. 11/138,546, filed May 25, 2005, Final Office Action dated Jun. 16, 2010, 31 pages.

U.S. Appl. No. 11/138,546, filed May 25, 2005, Office Action dated Jan. 6, 2010, 37 pages.

U.S. Appl. No. 11/138,546, filed May 25, 2005, Office Action dated Dec. 9, 2008, 33 pages.

Van Setten, Mark et al., "Context-Aware Recommendations in the Mobile Tourist Application Compass", AH 2004, LNCS3137, pp. 235-244, 2004.

RealNetworks, Inc., Using RTSP with Firewalls, Proxies, and Other Intermediary Network Devices, Version 2.0/rev.2, http:/docs.real.com/docs/proxykit/rtspd.pdf, 1998, 16 pages.

U.S. Appl. No. 11/138,546, filed May 25, 2005, Advisory Action dated Aug. 25, 2010, 3 pages.

U.S. Appl. No. 11/138,546, filed May 25, 2005, Notice of Allowance dated Nov. 26, 2010, 6 pages.

U.S. Appl. No. 11/475,280, filed Jun. 26, 2006, Advisory Action dated Feb. 17, 2010, 2 pages.

U.S. Appl. No. 11/475,280, filed Jun. 26, 2006, Final Office Action dated Oct. 26, 2010, 18 pages.

U.S. Appl. No. 11/475,280, filed Jun. 26, 2006, Final Office Action dated Nov. 25, 2009, 17 pages.

U.S. Appl. No. 11/475,280, filed Jun. 26, 2006, Office Action dated May 25, 2010, 16 pages.

U.S. Appl. No. 11/475,280, filed Jun. 26, 2006, Office Action dated May 8, 2009, 15 pages.

U.S. Appl. No. 11/475,280, filed Jun. 26, 2006, Advisory Action dated Feb. 1, 2012, 2 pages.

U.S. Appl. No. 11/475,280, filed Jun. 26, 2006, Final Office Action dated Nov. 30, 2011, 12 pages.

U.S. Appl. No. 11/475,280, filed Jun. 26, 2006, Office Action dated Jul. 22, 2011, 14 pages.

* cited by examiner

PLATFORM AND SERVICE FOR MANAGEMENT AND MULTI-CHANNEL DELIVERY OF MULTI-TYPES OF CONTENTS

CROSS-REFERENCES TO RELATED APPLICATIONS

The present application incorporates by reference for all purposes the entire contents of the following:

U.S. Application No. 11/137,969, entitled "PERSONALIZATION AND RECOMMENDATIONS OF AGGREGATED DATA NOT OWNED BY THE AGGREGATOR", filed concurrently on May 25, 2005; and U.S. application Ser. No. 11/138,546, entitled "TECHNIQUES FOR ANALYZING COMMANDS DURING STREAMING MEDIA TO CONFIRM DELIVERY", filed concurrently on May 25, 2005.

BACKGROUND OF THE INVENTION

The present invention generally relates to telecommunications and more specifically to a platform for management of multichannel delivery of multi-types of content.

Content can be delivered through a growing number of channels. Traditionally, content, such as videos, movies, etc., were delivered through wireline systems, such as cable. With the advent of next generation telecommunication networks, such as 3G, this content may be delivered to mobile devices. Accordingly, for example, video and data, may be sent to users using their mobile devices, such as cellular phones, personal digital assistants, etc.

The wireless and wireline systems that delivered the content are typically different. For example, telecommunication operators typically use different platforms to deploy systems that allow mobile download of content than systems used to provide content through wireline networks. Accordingly, content management and delivery is difficult when combining delivery across both wireline and wireless networks. There is redundancy at integration points due to various network elements and resources, difficulty in cross selling due to disparate content management systems, inflexibility in supporting new content types for the future, and difficulty in extending or customizing the functionality to add new capabilities. The potential for generating new revenue streams by providing content across wireless systems is great. However, the mobile space includes many devices that communicate through many different channels. Accordingly, it is difficult to provide content to all the devices communicating through all the channels.

BRIEF SUMMARY OF THE INVENTION

The present invention generally relates to a platform for delivering multi-types of content through multi-channels. In one embodiment, a platform for managing delivery of content originating from one or more content providers to users is provided. The platform includes a portal that is configured to support access through a plurality of access channels configured to receive requests through one or more access channels. A request for content is received from an access device through an access channel. An identity management module is configured to determine a user associated with the message. A content manager is configured to manage content for delivery through the plurality of access channels and configured to determine eligible content for the user. A billing module is configured to process billing for the user and content provider based on the content provided to the user. The content manager is then configured to deliver the requested content to the user's access device through the access channel.

In one embodiment, a platform for managing delivery of content originating from one or more content providers to users is provided. The platform comprises: a portal that support access through a plurality of access channels configured to receive requests through one or more access channels, wherein a request for content is received from an access device through an access channel in the plurality of access channels; an identity management module configured to determine a user associated with the message; a content manager configured to manage content for delivery through the plurality of access channels and configured to determine eligible content for the user; and a billing module configured to process billing for the user and content provider based on the content provided to the user, wherein the content manager is configured to deliver the requested content to the user's access device through the access channel.

In another embodiment, a method for delivering content originated from one or more content providers to mobile devices communicating through a plurality of channels using a platform is provided. The method comprises: determining eligible content for a user based on user preferences and content available through an access channel and access device of the user; sending a list of the eligible content to the user's access device through the access channel; receiving a request for content through an access channel in a plurality of access channels; delivering the requested content to the user's access device through the access channel; and billing the user based on the content provided to the user.

In yet another embodiment, a method for delivering services to mobile devices communicating through a plurality of channels using a platform is provided. The method comprises: receiving content from a source; determining metadata based on the delivery of the content; and processing the content using the metadata in order to allow the content to be available through one of the plurality of access channels, wherein the platform is configured to deliver services to the devices through the plurality of channels.

In another embodiment, a platform for delivering content originated from one or more content providers to mobile devices communicating through a plurality of channels is provided. The platform comprises: logic configured to determine eligible content for a user based on user preferences and content available through an access channel and access device of the user; logic configured to send a list of the eligible content to the user's access device through the access channel; logic configured to receive a request for content through an access channel in a plurality of access channels; logic configured to deliver the requested content to the user's access device through the access channel; and logic configured to bill the user based on the content provided to the user.

In another embodiment, a platform for delivering services to mobile devices communicating through a plurality of channels using a platform is provided. The platform comprises: logic configured to receive content from a source; logic configured to determine metadata based on the delivery of the content; and logic configured to process the content using the metadata in order to allow the content to be available through one of the plurality of access channels, wherein the platform is configured to deliver services to the devices through the plurality of channels.

A further understanding of the nature and the advantages of the inventions disclosed herein may be realized by reference of the remaining portions of the specification and the attached drawings.

DETAILED DESCRIPTION OF THE INVENTION

Figure 1:
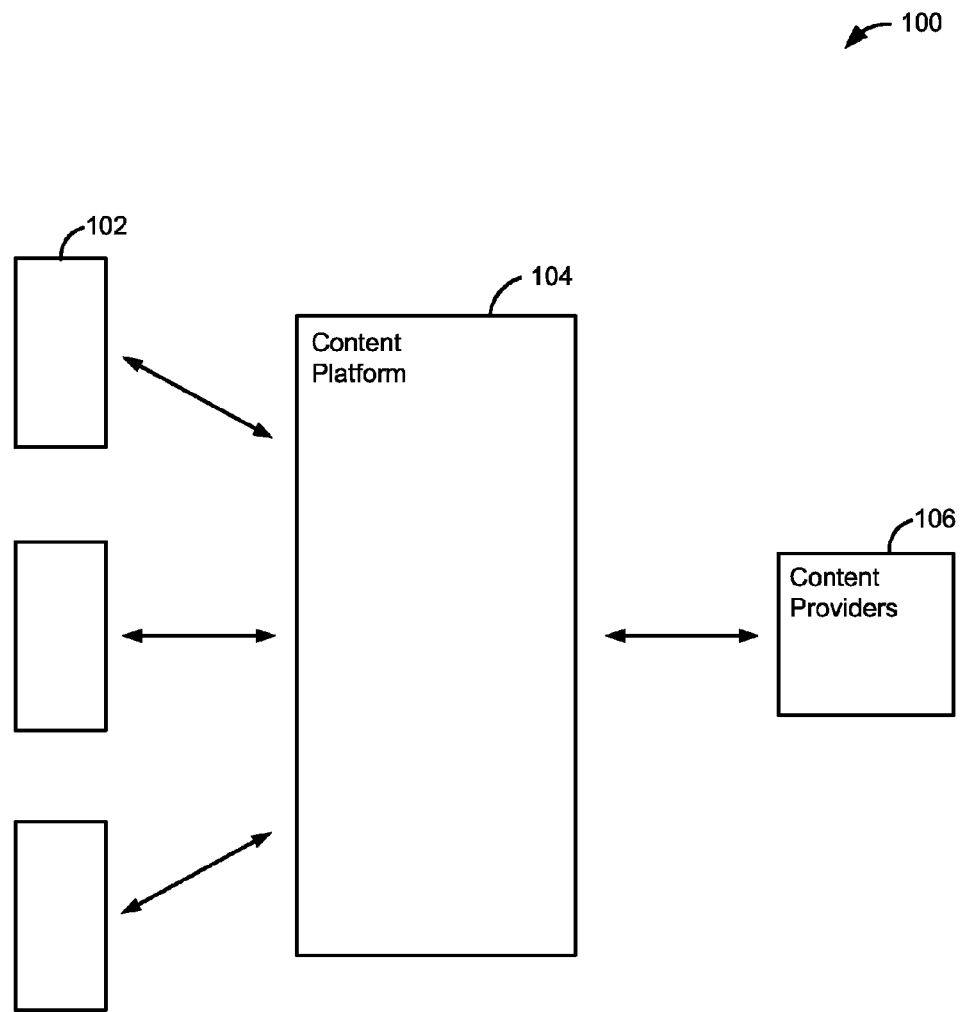
FIG. 1 depicts a system for managing content according to one embodiment of the present invention.

FIG. 1 depicts a system 100 for managing content according to one embodiment of the present invention. In one embodiment, system 100 includes one or more access devices 102, a content platform 104, and sources 106.

Access devices 102 include any devices that can send messages through access channels. An access channel is a channel in which messages of a certain format or protocol may be sent. For example, the messaging formats may be short message service (SMS), multimedia messaging service (MMS), voice, email, instant message (IM), facsimile, HyperText Transfer Protocol (HTTP), etc. In one example, SMS messages may be sent through an SMS access channel. Also, MMS messages may be sent through an MMS access channel and HTTP messages may be sent through the Internet. Each access channel may require a different protocol or format in order to send the messages through the channel.

Access devices 102 may include cellular phones, personal digital assistants (PDAs), personal computers, workstations, fax machines, plain old telephone service (POTS) telephones, etc. Access devices 102 are configured to send messages through access channels. For example, an SMS device sends messages through an SMS channel. Also, a access device 102 may be configured to send messages through multiple access channels. For example, a cellular phone may be configured to send SMS and MMS messages through SMS and MMS access channels.

Content platform 104 is configured to provide content to access devices 102. Content may be provided from external sources 106 or from content stored locally to messaging server 104. Examples of content may include any information. For example, content may be multimedia information, videos, data, television programs, audio information, etc.

Sources 106 may be any entities that provide content. For example, sources 106 may be content providers that may make content available through platform 104.

Figure 2A:
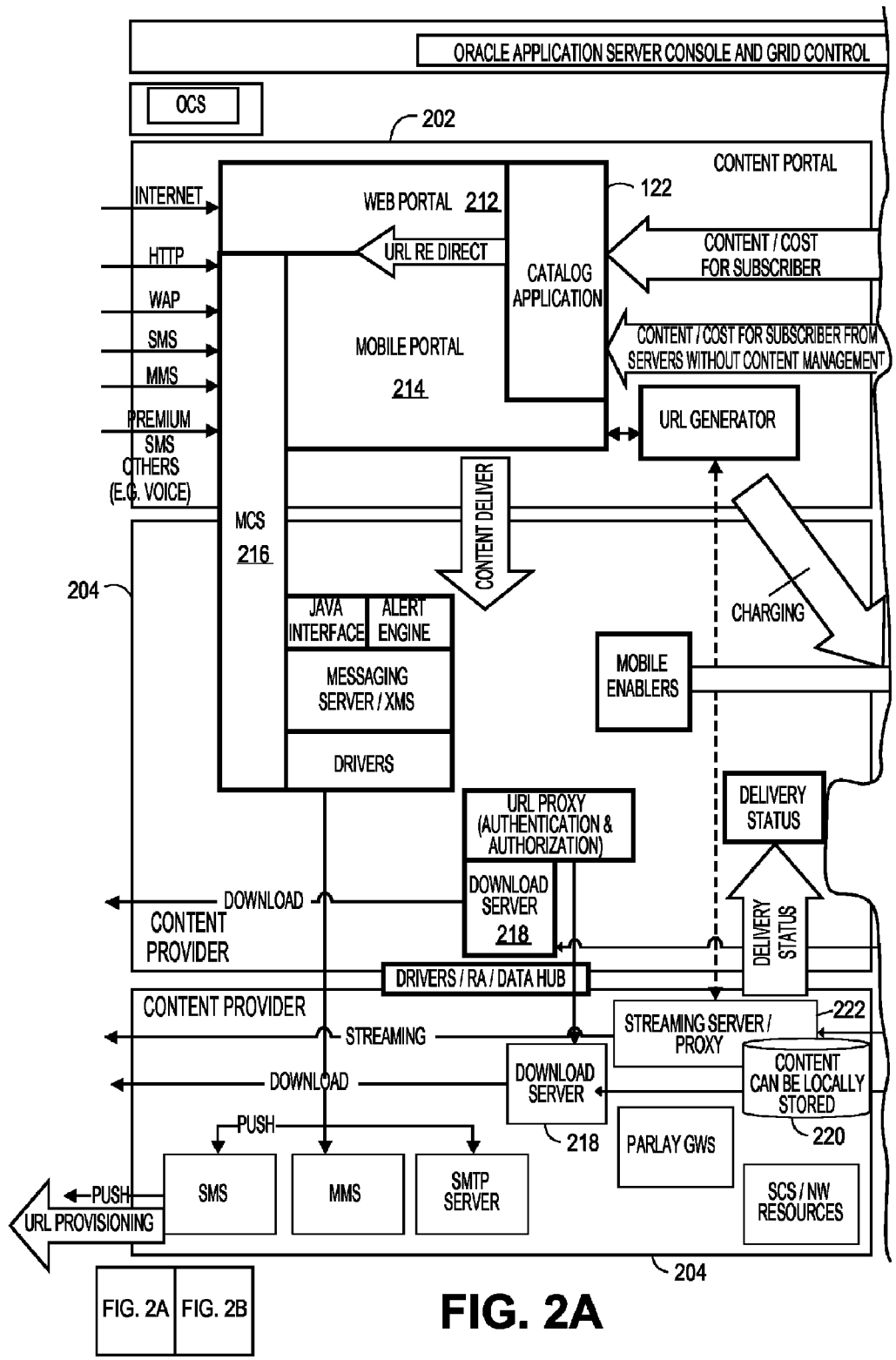
FIG. 2 depicts an embodiment of a content platform according to one embodiment of the present invention.
Figure 2B:
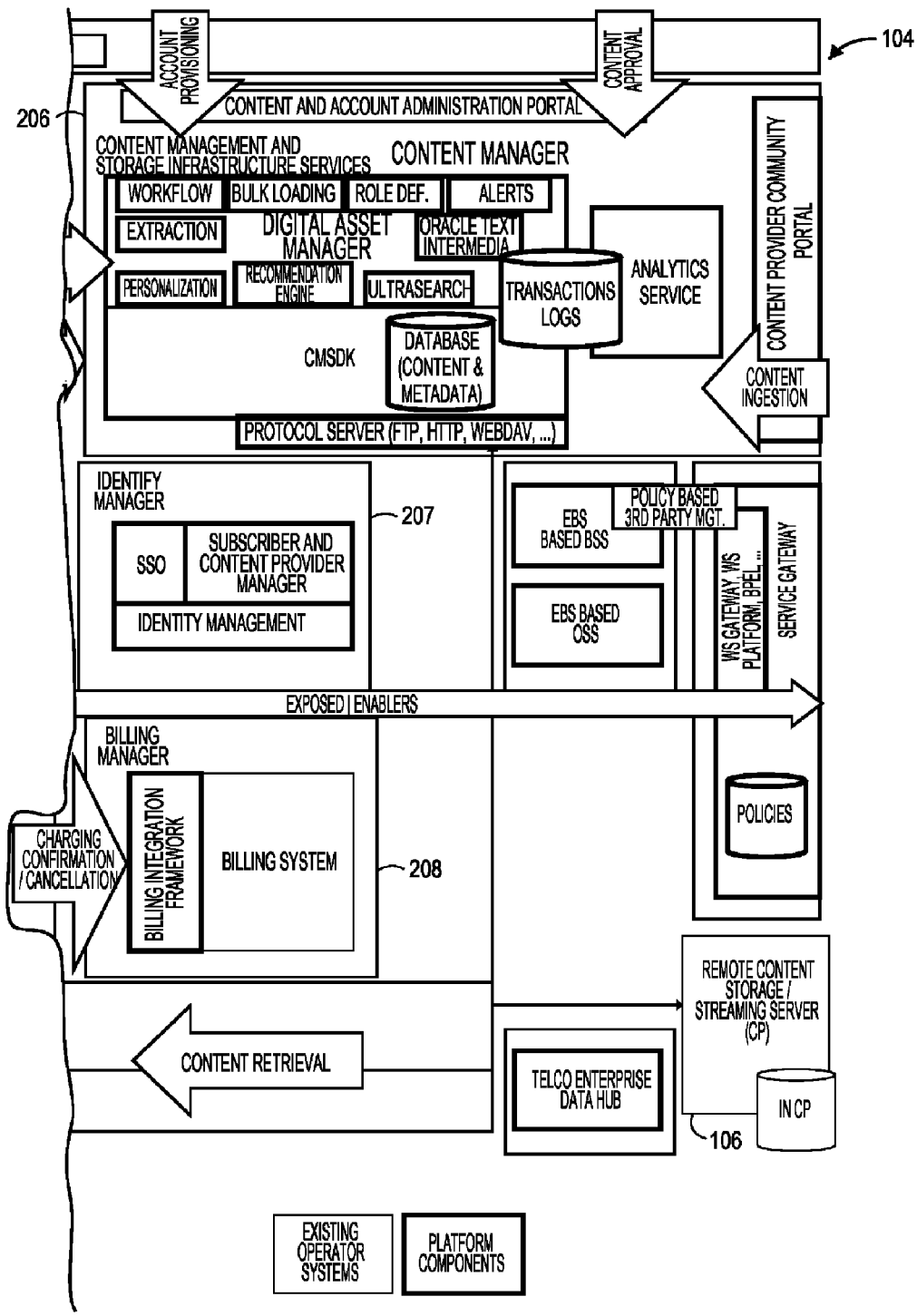

FIG. 2 depicts a more detailed embodiment of content platform 104 according to one embodiment of the present invention. As shown, content platform 104 includes a content portal 202, a delivery service module 204, a content manager 206, an identity manager 207, a billing manager 208, and a network gateway.

Content portal 202 is configured to receive messages from messaging devices and requests from access devices 102 through one or more access channels. For example, portal 202 may be configured to receive messages using hypertext transfer protocol (HTTP), wireless application protocol (WAP), short message service (SMS), multimedia message service (MMS), premium SMS, voice, HTTP, etc.

As shown, portal is provided to process different messaging types. For example, a web portal 212 is provided to receive and send messages using HTTP through the Internet. A mobile portal 214 is provided to receive messages through WAP, SMS, MMS, and premium SMS. Additionally, multi-channel server (MCS) 216 is provided that can send messages across multiple access channels and also adapt content to different access channels. Details of an MCS are provided in U.S patent application Ser. No. 10/684,686 entitled Intelligent Messaging, filed Oct. 13, 2003 (issued to Assignee as U.S. Pat. No. 7,171,190 on Jan. 30, 2007), which is hereby incorporated by reference in its entirety for all purposes.

Portal 202 enables a user to browse available content that may be provided to the user. A user may preview the content and eventually order the content by sending messages through portal 202. The user may browse and access content through any number of access channels that are compatible with portal 202.

Content provider 204 is configured to provide content to access devices 102. The content may be provided using a download server 218. The content may be downloaded using digital rights management. The content provided also may be locally stored or streamed from a remote source 106. For example, the content may be received from a remote source 106 and stored in a storage device 220 (which can be local or remote). After which, content may be downloaded through download server 218.

The content may also streamed from source 106. In this case, the content may be streamed through a streaming server/proxy 222 to access devices 102. In another embodiment, the content may be stored in storage device 220 and then downloaded to access devices 102.

Content manager 206 is configured to provide management tools for the content. For example, content manager 206 is used to determine device requirements (i.e., what content is suitable/OK for a particular device), description requirements (e.g. what a device requires to be usable/viewable...), pricing, whether content should be previewed (how often should it be allowable), categorization of content, any relevant metadata useful to help (e.g., details on contact information for prior to buying, links to contact to preview, categories and keywords for content to related content (and recommend / associate to user), conditions for viewing, how long to make the content available, pointers to DRM rights, how to transform/adapt content for a device, information on whether the content provider is authorized to adapt, what access device 102 content manager 206 explicitly supports, what devices 102 may be a problem, etc. For example, in determining which content should be provided to a-access device 102, content manager 206 uses metadata associated with the user and content to determine how to format the content. In one example, the metadata may indicate that a user is using a device that is configured to receive SMS message. The content may then be sent in a series of SMS messages (or ring tones).

Content manager 206 also provides business intelligence for a user that may be used to improve sales, provide recommendations (based on purchase patterns, user preferences), determine success of the content, etc.

Identity manager 207 is configured to determine an identity of a user. A user's identity may be determined based on a user identifier provided with a message sent to messaging portal 202. For example, the user may be identified using a user name and password, a cookie, an identifier, such as a phone number, that is used to send the message, etc. Thus, identity manager 207 is configured to determine a user that sent a message.

Additional information stored for a user may be what the user has previously purchased, what content the user has subscribed to, patterns of purchases that can be used for recommendations, and transactions identifiers to previous transactions. Also, information on user identifiers for access devices 102, what devices the user uses, the access channels, permissions, and other user preferences may be stored. Identity manager 207 also supports single sign-on for content from sources 106.

Billing manager 208 is configured to manage the billing for content provided to a user. For example, the content may be provided based on a prepaid or postpaid model. The prepaid model is where a user prepays a certain amount for content. When content is provided to the user, the prepaid account may be debited by the amount charged for the content. With the postpaid method, billing manager 208 is configured to provide the content and then charge the user.

Billing manager 208 is configured to access a user's checking account to debit money for delivered content, reserve an amount of money for a user, bill an amount of money, etc. Also, billing manager 208 is configured to receive confirmation for any actions taken for the billing and store the confirmation or send it to the user.

Billing manager 208 can also cancel a billed amount of money (e.g., based on the amount and a transaction ID), allow the cancellation of a reserved amount of money (e.g., based on the amount and a transaction ID), and confirm a reservation of money (e.g., based on the amount and a transaction ID). Also, billing manager 208 can correct a bill (refund a charge) if delivery failed or a user complained about delivery.

The delivery status of the content may be determined in multiple ways and used to determine if a user should be billed for content. For example, commands may be sniffed when content is streamed to an access device 102 and used to determine a delivery status for content. This is described in more detail below.

Also, if content is downloaded through a download server, whether all the content is downloaded may be used to determine a delivery status. For an HTTP/FTP request, it can be checked if access was allowed or the content was downloaded. Also, billing manager 208 can determine if there were any error messages, delivery statistics, or any other indications of errors while delivering the content.

Because platform 104 is managing content for a plurality of sources 106, billing manager 208 may bill or send money to sources 106 when their content is downloaded by a user. Billing manager 208 is configured to manage the relationship and allow revenue sharing between the service provider and sources 106.

Content platform 104 may be configured to deliver content to access devices 102 to manage and upload content from sources 106. The process of delivering content to access devices 102 will be discussed first.

Content Delivery

Figure 3A:
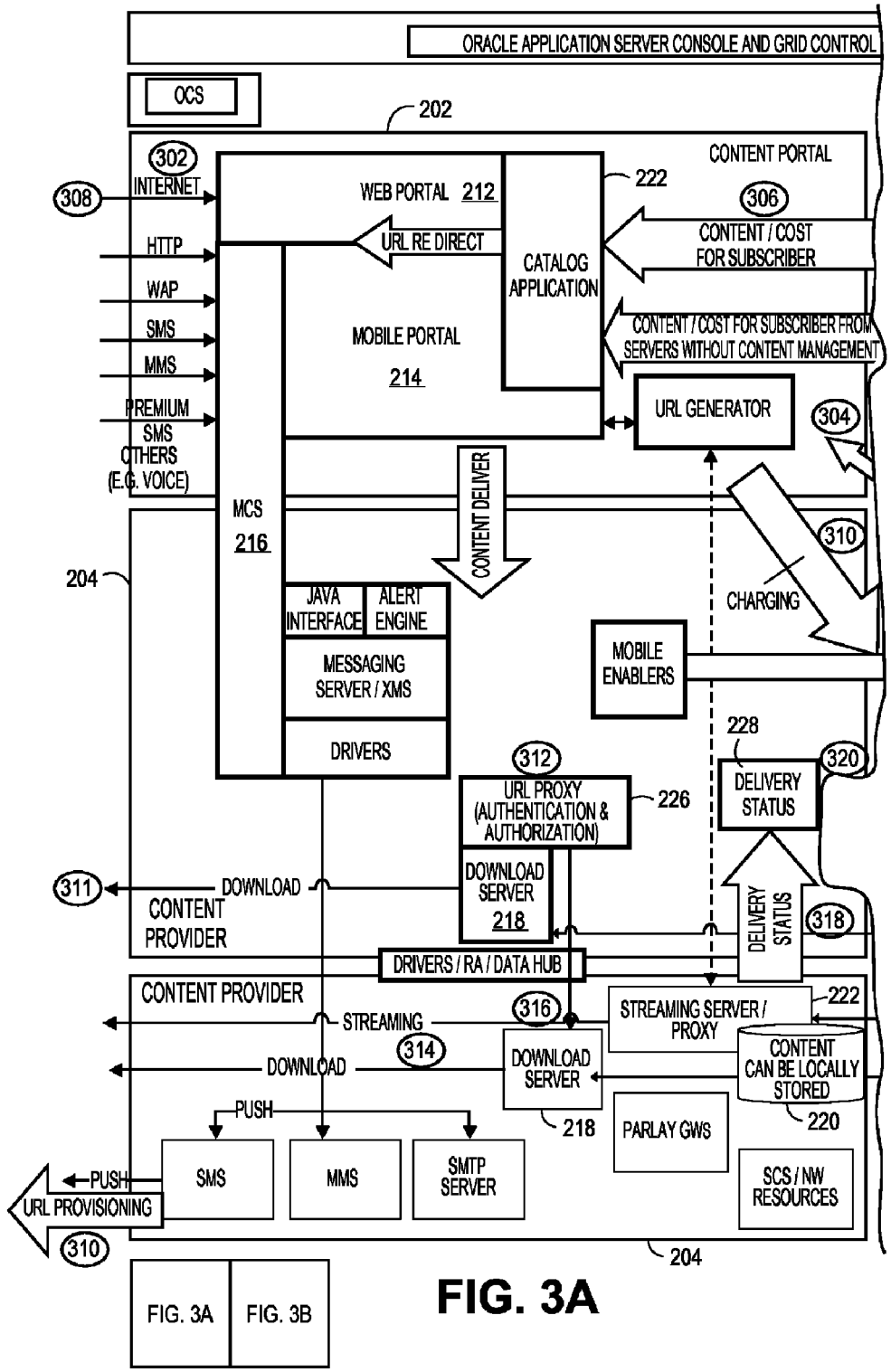
FIG. 3 depicts a data flow for content delivery using the platform according to one embodiment of the present invention.
Figure 3B:
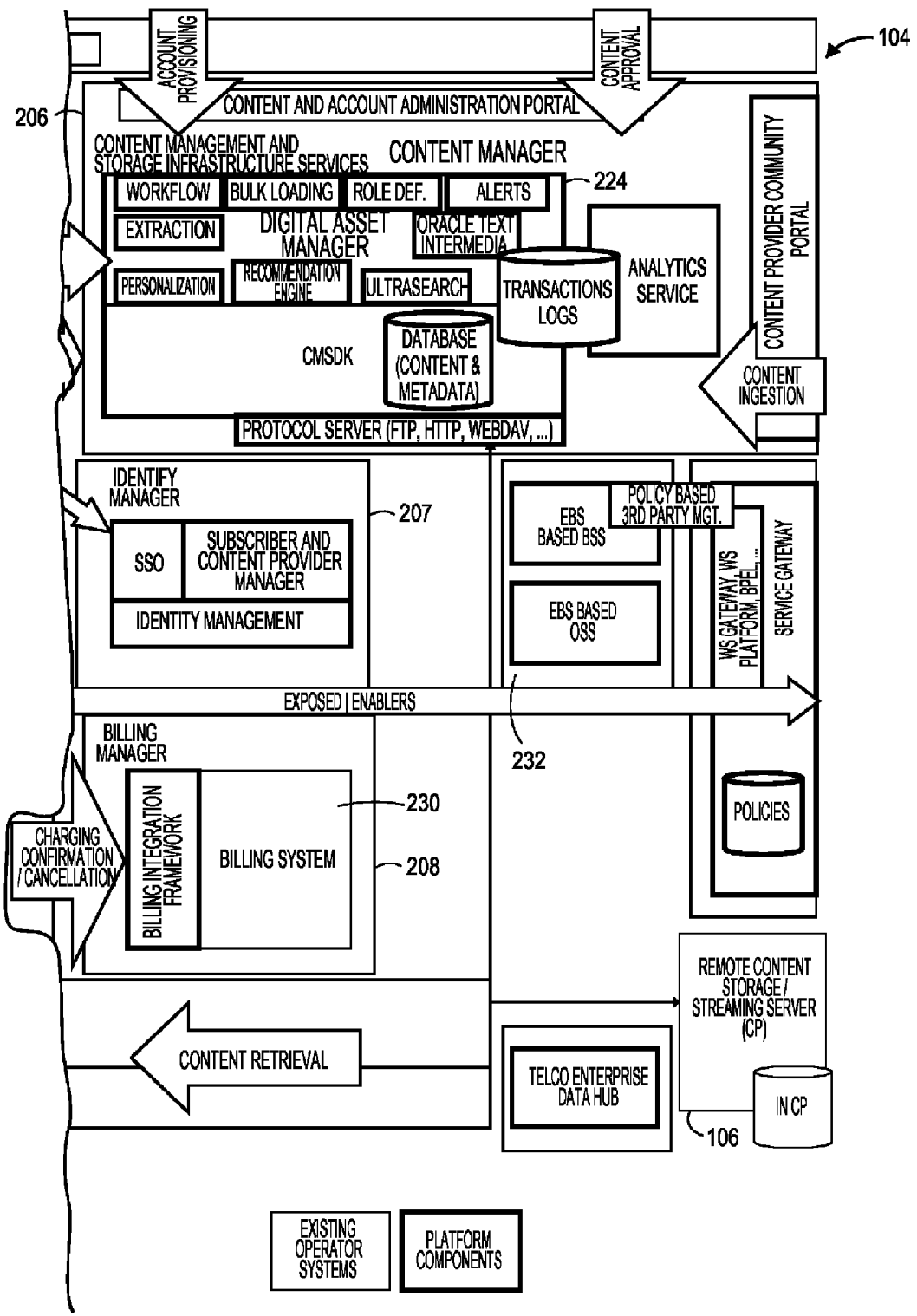

A method will be described in FIG. 3 using a block diagram of content platform 104.

At 302, a message is received from a user at portal 202. For example, a request may be sent through web browsing, WAP browsing, or messaging, such as SMS, MMS, etc.

A catalog application 222 is configured to receive the request and provide a menu of available content to access device 102. Catalog application 222 is configured to recognize the user that sent the message. For example, a user identifier may be determined for the user. A cellular phone number, cookie, ID and password, etc. may be used to determine the identity of the user.

At 304, catalog application 222 communicates with identity manager 207 to determine the identity of the user. Identity manager 207 may determine or recognize which access device 102 a user is using. For example, if an HTTP request is received, the header may be recognized and the type of device used to send a message is determined. Also, a user ID for a user may be used to determine which device the user is using. For example, if a cellular telephone number is used to send a message, then it may be determined that SMS, WAP, or MMS may be used.

Identity manager 207 may also determine which subscription models a user is using. For example, a user may have access to premium content, such as CNN alerts, fantasy sports, etc. Identity manager 207 determines which types of content a user may have subscribed to or is interested in.

At 306, catalog application 222 communicates with content manager 206 to determine content for a user. In one embodiment, a digital asset manager 224 is configured to determine which content is available for the user. In determining which content is available for the user, it may be determined which content a user has subscribed to. For example, any premium services or subscription models that a user is identified as owning may be determined. Additionally, the content determined may be based on the type of device a user has. For example, some content may be compatible with a web browser and some content may be compatible with a cellular phone. Accordingly, the different channels that these devices communicate through may determine which content is available. Also, content may be adapted to channels that devices communicate through.

Content may also be determined based on user preferences and past usages. For example, if a user typically orders content from a certain service, that content may be made available.

Digital asset manager 224 determines a list of possible content. Metadata for the content is also determined. Metadata may be information about the content, such as price, subscription information, rights, if a preview should be offered, a format that can be displayed on access device 102, etc. The information is returned to catalog application 222.

Catalog application 222 is then configured to generate a menu using the information returned from digital asset manager 224. The menu may list content that is available to the user. For example, the menu of available content may be in the form of a uniform resource identifier (URI) that can be selected or in the form of other messaging menus (e.g., select 1 for a first URI, select 2 for a second URI, etc.). The different URIs may correspond to different content.

A user may interact with the menu until the user finds content that he/she wants to purchase. For example, a user may select a URI for certain content or a user may select a number, such as 1, that corresponds to a URI and send a message with that number to content platform 104. A message with the selection is then sent back to catalog application 222 through portal 202 at 308.

At 310, catalog application 222 generates a billing event for billing manager 208. In one embodiment, the billing models that may be used are prepaid and postpaid. In prepaid, billing manager 208 may deduct the amount for the content requested before providing the content. In postpaid, billing manager 208 may log the billing event and charge the user after providing the content. In the postpaid model, billing manager 208 may check the account of the user to see that it is in good standing and then prepare to charge the user's account. This billing event may then be stored with the account (e.g., an account number) of the user.

At 311, the uniform resource identifier (URI) (e.g., a URI may be a uniform resource locator (URL)) is selected is provided to access device 102 such that the URI is sent to content portal 202. For example, when the URI is selected, the URI should be sent to portal 202. In one embodiment, when the selection of URIs is received, a browser for the access device 102 is redirected to the URI selected. The redirection methods will be appreciated by a person skilled in the art. In one embodiment, content provider 204 may provide URI provisioning through SMS, MMS, or SMTP. In this case, the URI is sent via messaging to the device, which then causes the device to send the URI to content portal 202.

The URI received at portal 202 corresponds to the content associated with the URI. In one embodiment, the URI may be encrypted and portal 202 passes the encrypted URI to URI proxy authentication and authorization module 226. The encrypted URI may be sent to a URI proxy authentication and authorization module 226 for decryption and authorization. In one embodiment, URI proxy authentication and authorization module 226 may check subscription information to determine if a user is authorized to receive the content. If the user is not, then an error message may be sent back to the user at access device 102. If the user is authorized to receive the content, then the URI may be decrypted and the decrypted URI may be passed to download server 218 or streaming server/proxy 222. Accordingly, the content may be pushed, downloaded, or streamed.

Content may be stored locally in storage device 220 or may be streamed from a source 106. At 314, if the content is stored locally, in storage device 220, the content may be sent using download server 218. The content may be retrieved from storage device 220 and sent using download server 218. Also, when a request is received, source 106 may send the content to storage device 220. The content may be stored and then retrieved when necessary by download server 218 and sent to the access device 102.

At 316, content may be streamed from source 106 to access device 102. In one embodiment, content can be first stored locally in storage device 220 and then streamed from storage device 220. If the content is stored remotely in a source 106, streaming server/proxy acts as a proxy to stream data to access device 102. For example, content may be streamed from a website such as CNN. For example, a live news brief or news report may be streamed to access device 102. The content is streamed through streaming server/proxy 222 to access device 102. Although the content is streamed from source 106, the user may not know it is coming from source 106 and it appears that the content is being provided by platform 104.

After download (via URI access, through a download server, or streaming delivery), a delivery status is generated at 318. The delivery status may indicate statistics for the downloaded content. For example, the status may indicate if access device 102 was able to download the content. In one example, if a access device 102 is unable to download the content, then the device may not be charged. Also, if the content was delivered in streaming fashion, the delivery status indicates if the stream is finished and also the quality of service. In one example, if the quality of service is poor, then the user may not be charged. The process of determining a delivery status will be described in more detail below.

Delivery status module 228 determines if the user should be billed for the content requested. At 320, an indication whether to charge the user or cancel the charge is sent to billing manager 208. A billing system 230 then determines an action to take. For example, if the content delivery failed and the payment model was prepay, then a user's account should be credited. This is because the prepaid account would have been debited before delivering the content. Thus, the content delivery failed and the user should not be charged. If the content delivery failed and the payment method was postpaid, then the user is not charged for the content request. If the content delivery was successful, then billing system 208 charges the user account for the content request. If the payment model was prepaid, then an action is not taken except to note that the user received the content.

Delivery status module 228 may also log the download/access (e.g. to count how often a user downloaded content, which can be used to determine if a user is authorized to download content later).

Invoice manager 232 is then configured to generate an invoice for the user. The invoice can be generated using business support systems (BSS) or EBS-based operation support systems (OSS). The invoice may then be sent to a user through an access channel. For example, an email may be sent to a user confirming that the content was downloaded and the charges that were levied against the user's account.

Invoice manager 232 is configured to maintain billings between a user and content provider 106. A user may be billed and when payment is received, the payment (minus a fee taken by platform 104) may be forwarded to content provider 106.

Content Upload

Figure 4A:
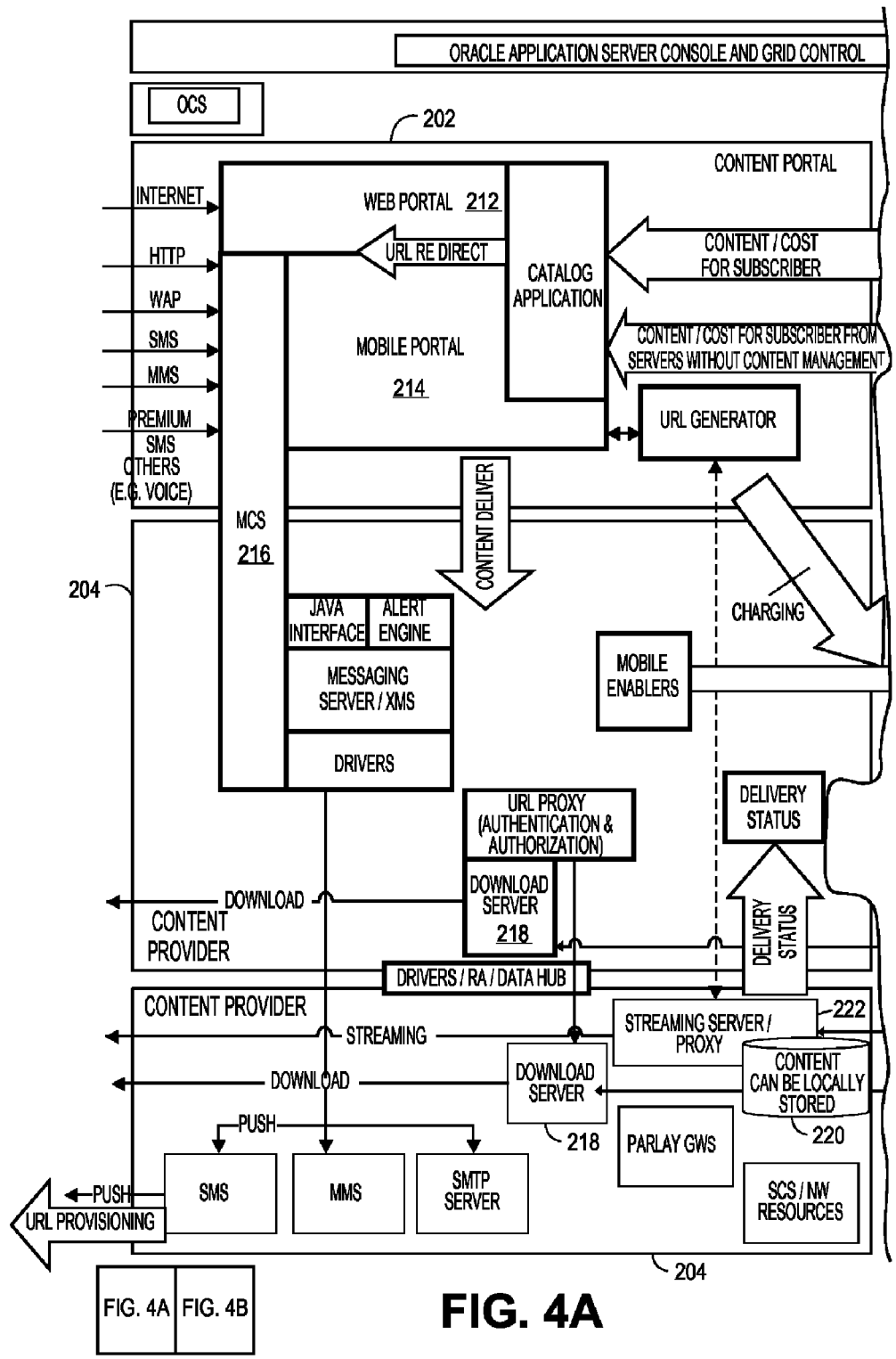
FIG. 4 depicts a data flow for content upload using the platform according to one embodiment of the present invention.
Figure 4B:
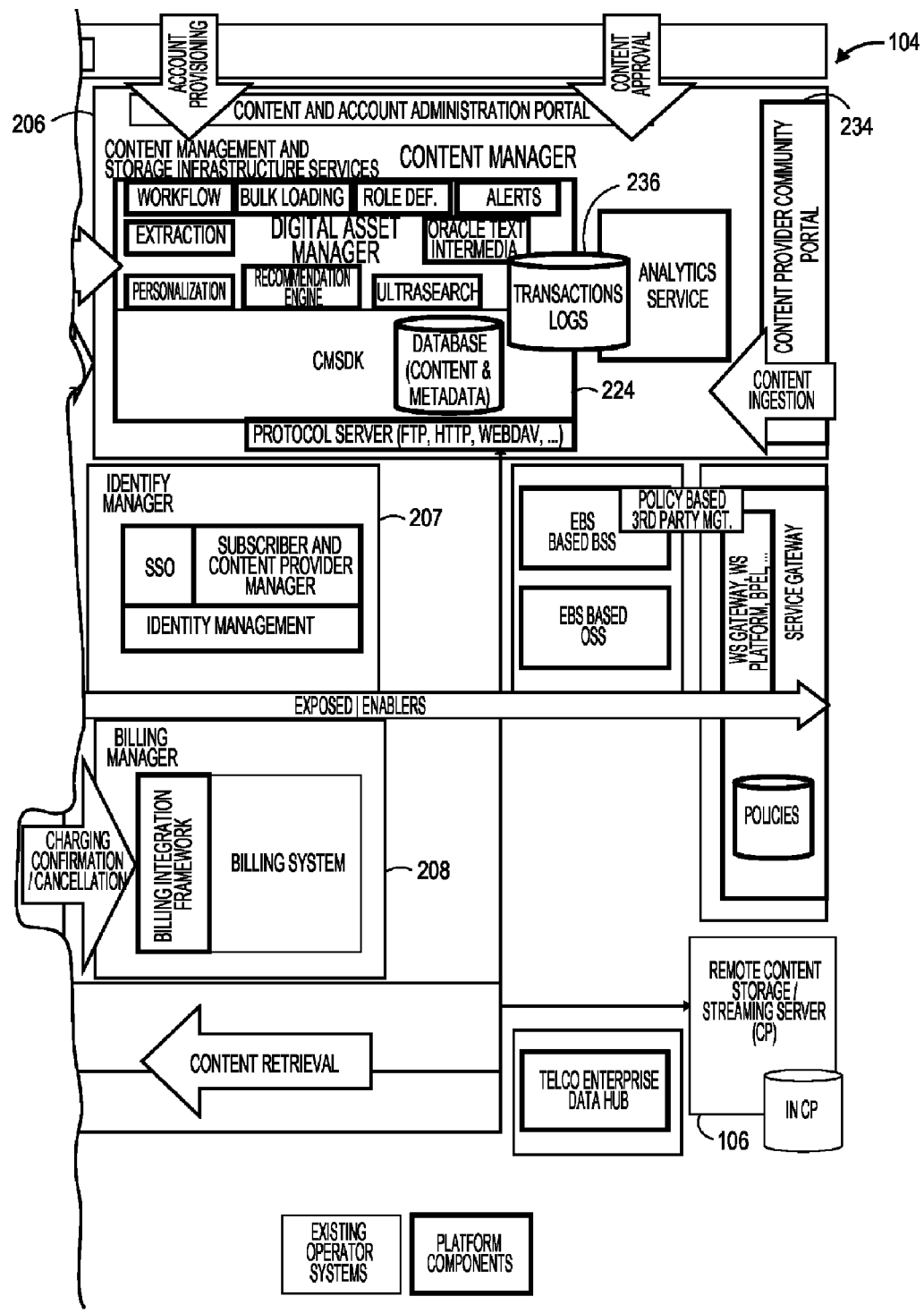

FIG. 4 depicts a data flow for content upload using platform 104 according to one embodiment of the present invention. In content upload, content may be provided by a source 106, such as a content provider or service provider. A content provider may be an entity that provides content, such as CNN, ESPN, etc. A service provider may be an entity that provides various services, such as AT&T Wireless, Comcast, etc. A service provider provides different contents for services, such as sports scores, weather, etc.

Content providers may access the content manager 206 through a content provider portal 234. Content providers may register with content manager 206 and access their account.

Content and associated metadata may be uploaded to content manager 206. The metadata may include rules, such as conditions for usage of content, subscription information such as prices and digital rights management, etc. The metadata may also be used to provide recommendations for the content provided. This process will be described in more detail below. Any references (URIs) to content that is associated is also uploaded with the content. This information may be stored in digital asset manager 224.

Digital asset manager (DAM) 224 is then configured to determine if the content should be made available. For example, digital asset manager 224 may send a message to a manager of content to determine if the content is acceptable for publishing. In one embodiment, a message may be sent to the administrator that enables the administrator to review the content. The administrator may then approve or reject the content. If an approval is received, digital asset manager 224 then makes the content available to users and does not if the content is rejected.

DAM 224 may include workflows that are followed when actions for content are taken. These workflows are provided to have steps performed when the action is taken. For example, DAM 224 performs a workflow when content is uploaded based on policies set by the service provider, based on who the content provider is who uploaded the content, and/or based on metadata associated with the uploaded content. DAM 224 may also perform a workflow when content is approved by the service provider, when content/catalog apps access the content to query what the workflow does, when content is accessed, and for content life cycle management (e.g. retire expired content). Workflows are described in more detail in U.S. application Ser. No. 11/024,160, entitled "POLICIES AS WORKFLOWS", filed Dec. 27, 2004, which is hereby incorporated by reference in its entirety for all purposes.

In one embodiment, the content may be stored somewhere else other than a digital asset manager 224, such as in local storage 220. A pointer to the content stored in storage device 220 may then be generated and stored in a transaction log 236.

Embodiments of the present invention determine a delivery status based on actions that occurred during delivery of the content. The delivery status may be determined for streaming content, content accessed via URI, or content downloaded via a download server/messaging server. The deliver status may be checked by checking that content was requested, accessed and all bits delivered as well as that no error was received from server/ client or network for the delivery and possibly if built in the content/downloaded application that no error message was received at installation/play. If a video is downloaded then played instead of streamed, it may be checked that the requested content was all downloaded. Also, if the player/video is configured that way, the player can indicate that the content was played. (E.g., another way is to see that a request to play resulted in asking for the DRM rights and therefore it can be assumed that it is successfully installed).

These actions may be interpreted and then it is determined if the delivery status is successful or not. The delivery status may be used for billing. For example, if the delivery status was unsuccessful, the user may not be billed for the content. The delivery status is thus determined from a billing standpoint and rules are used to determine if a billing action should be taken.

Determining a Delivery Status of Streamed Content

Figure 5:
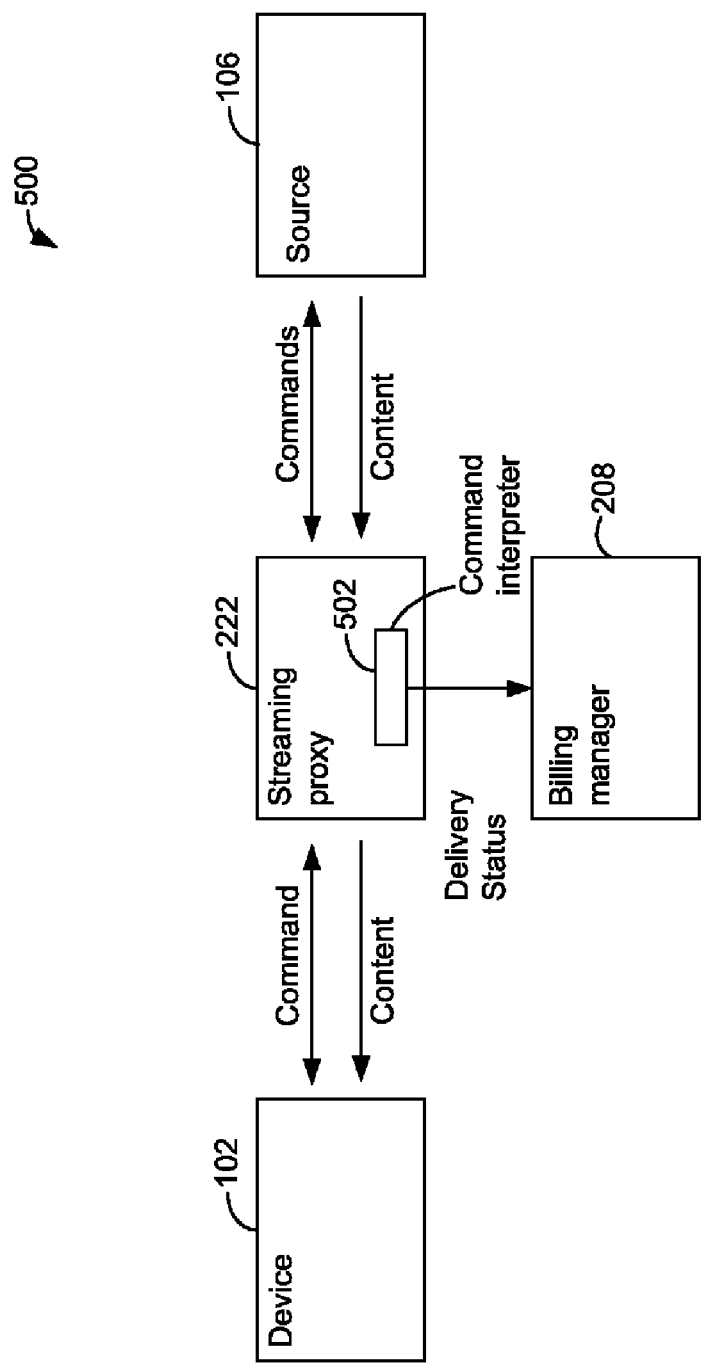
FIG. 5 depicts a system that is used to determine a delivery status for a streaming delivery of content according to one embodiment of the present invention.

FIG. 5 depicts a system 500 that is used to determine a delivery status for a streaming delivery of content according to one embodiment of the present invention. As shown, an access device 102, a streaming proxy 222, and a source 106 of FIG. 3 are provided. Access device 102 may be any device that can receive streaming content from source 106. For example, access device 102 may be a computer, cellular phone, personal digital assistant (PDA), television, etc. The request for content may be sent by access device 102 using any access channels as described above. In addition, a person skilled in the art will appreciate other methods of requesting the delivery of streaming content. For example, a user may call a service in order to request the streaming delivery of content. Further, the Internet may be used to request the content. In one embodiment, the device used to order the content may be different from the device that receives the content.

The content that may be streamed may be any kind of content. For example, the content may be a short video clip, movie, video, audio, or any other multimedia information.

When a request for a service for streaming delivery of content is received, source 106 is configured to provide the content. The content may be streamed through streaming proxy 222. As described above, the content is streamed from source 106 through streaming proxy 222 to device 102. In other embodiments, the content may be stored by a streaming proxy 222 in a database 220. In this case, when a request from device 102 is received, streaming proxy 222 may stream the content from database 220 to device 102.

Embodiments of the present invention determine if the delivery of content should be considered successful for a billing event. For example, the full delivery of content may be delivered, however, the content may have been delivered at a bit rate that was too slow for the user to effectively watch the video. Also, the streaming delivery of content may have failed during the setup. These are considerations that may need to be taken into account when billing the user.

In one embodiment, a user may be billed for the streaming delivery of content on a prepaid and/or postpaid billing method. The prepaid method is where a user may have an amount of credit for a source 106 and an amount for the service is debited from that amount before the delivery of the content. Also, the user may pay for the content either by prepayment methods, such as the user may input payment information (e.g., credit card information) before the delivery of content. Accordingly, a user is charged for the delivery of content before the delivery happens.

In a postpaid method, the user is billed for the method when a signal is received that the streaming delivery of content is finished. This may occur when the streaming content stops streaming to the user.

During the process of the streaming of content from source 106 to device 102, commands are sent between device 102 and source 106. For example, real time streaming protocol (RTSP) is a protocol that is used in order to stream content. This protocol defines certain commands that may be used in delivering the content. For example, set up commands may be sent between device 102 and source 106 in order to initialize the content delivery. Once the connection is initialized, play/pause commands may be sent from device 102 to source 106. This indicates when a user wants to play and pause the streaming delivery of content. When the delivery is done, tear down commands are sent between the source 106 and device 102 in order to end the session. Other commands may also be sent during the delivery of content. For example, if any errors occur, error messages may be sent.

In addition to the commands that are sent, when the delivery of content is finished, statistics on the delivery may be sent. Command interpreter 502 may intercept the statistics and analyze them in addition to the commands to determine a delivery status. The statistics may indicate the speed of the connection, if any errors occurred, etc. It is a general summary of the delivery of content and may vary between sources 106.

Typically, these messages are sent between source 106 and device 102. However, a command interpreter 502 is configured to intercept commands that are sent between device 102 and source 106. In this way, command interpreter 502 may analyze the sequence of commands and determine if a delivery status for the delivery of content.

Different factors may be taken into account as to whether the delivery status was successful. In one embodiment, the commands that are sent may or may not indicate explicitly that the delivery status should be successful. For example, a video may be played by a device 102 and the last second of the credits may generate an error message. In one embodiment, command interpreter 502 is configured to determine whether this delivery of content should be considered successful or not. The fact that an error occurred the last second may or may not cause command interpreter 502 to determine that the delivery should be determined to be successful or not. For example, command interpreter 502 may determine that even though an error occurred, it occurred in the last second of the video and thus, the user who requested the streaming delivery of content should still be billed.

Command interpreter 502 may include many rules on interpreting the sequence of commands that are intercepted. Depending on the sequence of commands received, command interpreter 502 is configured to determine if the streaming delivery of content was successful or not.

Also, command interpreter 502 may use a history of a user that requested the content. For example, a user may have a pattern of stopping delivery before a teardown command is sent. This may be used to avoid being billed but command interpreter 502 may deem the delivery successful if a teardown command is not sent for the user. Other patterns of access may also be analyzed.

When the delivery status is determined, it is sent to a billing manager 208. Billing manager 208 then can determine how the user should be billed based on the delivery status. For example, if the user was using a prepaid method, then the user's account may be credited with the amount that was debited before the delivery of content. Also, if the delivery was unsuccessful and the billing method is postpaid, then the user would not be charged for the streaming delivery of content. And if the delivery was successful, then the user would be charged for the delivered content if the billing method is postpaid.

Accordingly, command interpreter 502 provides techniques for determining a delivery status for streaming content delivery from source 106 to device 102. In another embodiment, the delivery status is not explicitly sent to platform 104. Accordingly, command interpreter 502 provides techniques for interpreting commands in order to determine if a content delivery was successful or not.

Figure 6:
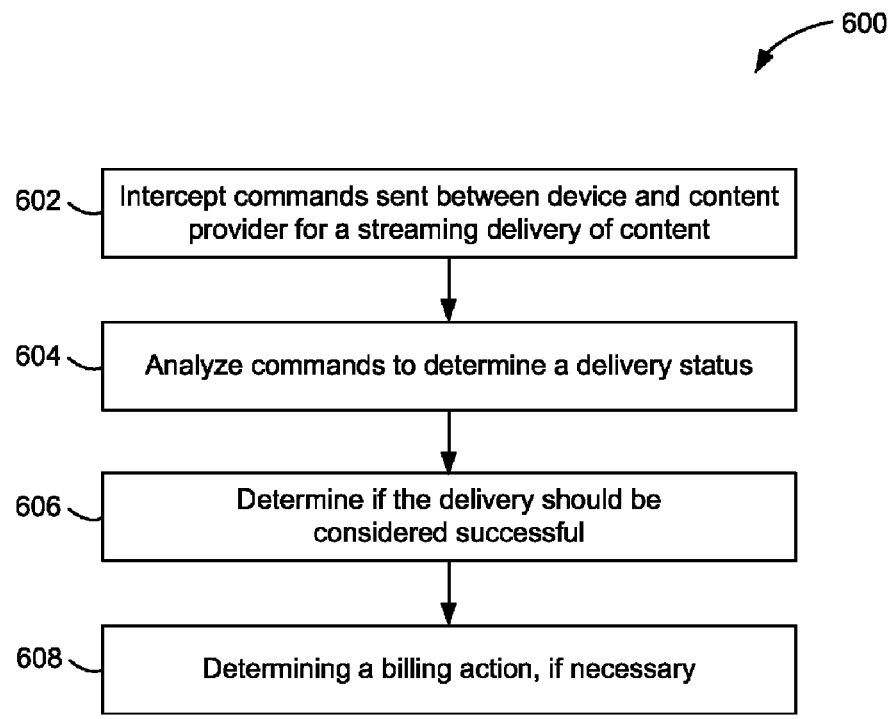
FIG. 6 depicts a simplified flowchart of a method for determining a billing action according to one embodiment of the present invention.

FIG. 6 depicts a simplified flowchart 600 of a method for determining a billing action according to one embodiment of the present invention. In step 602, commands sent between device 102 and source 106 are intercepted for a streaming delivery of content. The commands may be intercepted because the streaming delivery of content is streamed through a proxy 222 of content provider 104. Accordingly, content provider 104 may easily intercept the commands using command interpreter 502. Although the content seems to be streaming to device 102 directly from source 106, the content is being streamed from source 106 to streaming proxy 222, which then streams the content to device 102. Accordingly, commands sent between device 102 and source 106 are also sent through streaming proxy 222. Thus, the commands can also be intercepted in addition to being relayed between device 102 and source 106.

In step 604, the commands are analyzed to determine a delivery status. A rules base may be provided that uses a sequence of commands sent in order to determine what a delivery status should be. The delivery status may be that the delivery is successful or unsuccessful. Additionally, varying degrees of how successful or unsuccessful the delivery status was may also be determined. For example, the successfulness of a delivery may be rated as three quarters if three quarters of a video is shown.

In step 606, it is determined if the delivery should be considered successful. Using the rules base, the delivery status is determined. This may vary for different types of content that is delivered. For example, a video may have to be delivered at a certain bit rate in order to be considered successful. Additionally, an audio file may be delivered without losing a certain number of packets to be considered successful. Additionally, if errors occurred in delivering the content, then, a delivery may be considered unsuccessful.

In step 608, a billing action is determined, if necessary. For example, depending on the billing method that was used, different billing actions may be determined. For example, if the billing method was prepaid, then a user's account may be credited if the delivery was unsuccessful. If the delivery was successful, then no action may be taken. If the billing method was postpaid, and the delivery was successful, the user's account may be billed. If the delivery was unsuccessful, the user's account may not be billed in the postpaid method.

As discussed above, the commands sent may be intercepted and may be RTSP commands. Although RTSP commands are described, it should be understood that other types of commands may be intercepted. For example, any commands that are necessary in order to provide streaming delivery of content may be intercepted. For example, other protocols such as session initiation protocol (SIP), streaming download protocol (SDP), real-time transport protocol (RTP) or other proprietary protocol commands may be intercepted and analyzed.

Figure 7:
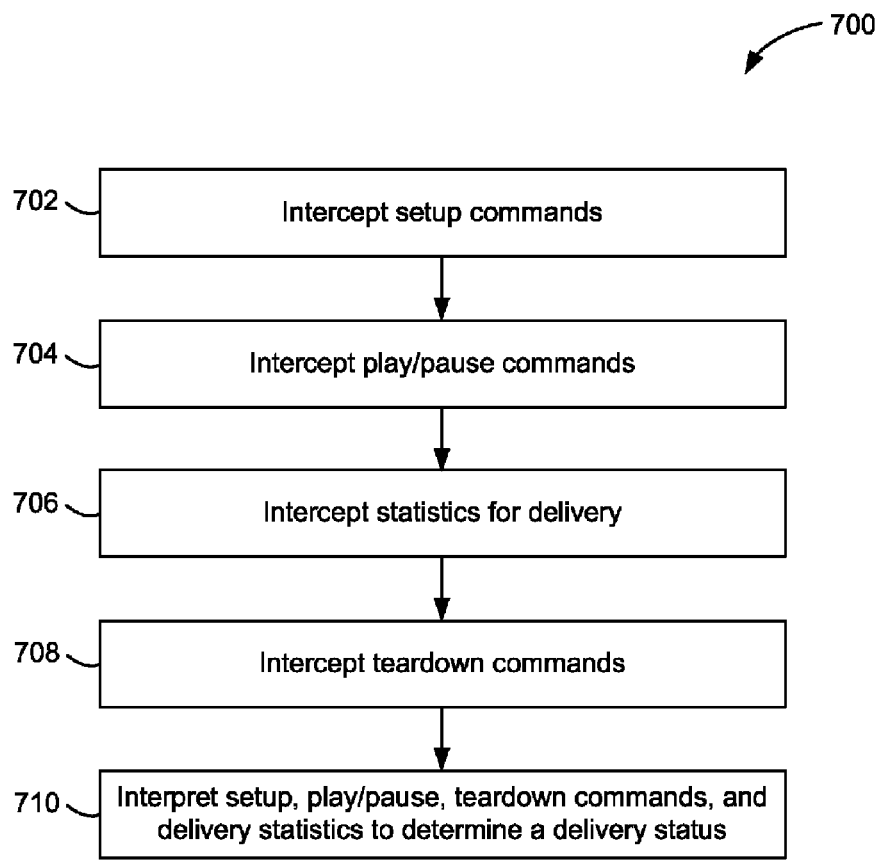
FIG. 7 depicts a simplified flowchart of a method for intercepting and interpreting RTSP commands according to one embodiment of the present invention.

FIG. 7 depicts a simplified flowchart 700 of a method for intercepting and interpreting RTSP commands according to one embodiment of the present invention. In step 702, a set of commands sent using RTSP are intercepted. For example, a uniform resource locator (URI) is entered in a device 102. For example, the URI may be typed into a web browser. Device 102 then parses the RTSP URI in order to determine a streaming server name and port. If the server name is not in an IP format, device 102 performs a DNS lookup to get the streaming server's IP address from the DNS name. Device 102 then initiates a transfer control protocol (TCP) connection to source 106.

When a connection to source 106 has been successfully established, device 102 sends source 106 an options request. The server returns option information back to device 102. This information can include the version of RTSP, the date, the session number, a server name, and the RTSP method supported by this session, and so on.

Device 102 then sends source 106 a DESCRIBE REQUEST to retrieve a description of the content. The request includes an accept header that specifies the session description protocol (SDP) format. Source 106 responds with initialization information required for the delivery of content. The SDP header information for the presentation is also included in the returned information.

Device 102 then sends source 106 a SET UP request for each stream required to play back the content. The set up request specifies the acceptable transfer protocols for streaming the content. If the content includes an audio and video stream, then one SET UP request is sent for the audio stream and a second SET UP request is sent for the video stream. Source 106 then responds with acceptable network transports (transfer control protocol (TCP), uniform datagram protocol (UDP), multicast) and protocols (RTSP, RTP) for the individual streams of content.

Device 102 then initializes the appropriate rendering plug-in required to play back the streaming delivery of content. Device 102 then sends source 106 a SET PARAMETER request that includes delivery bandwidth for the stream.

Delivery bandwidth either can be a fixed bit rate or can be a current bandwidth specified by the client's bandwidth preference. Any of the above commands may be intercepted as setup commands.

In step 704, PLAY/PAUSE commands are intercepted. After the SET PARAMETER request is sent, device 102 may send a PLAY request that warns source 106 that it should begin sending streaming content to device 102. During the streaming session, device 102 periodically pings source 106 with the SET PARAMETER request. Although source 106 responds to this request with an error message, the message is ignored and device 102 is kept aware that source 106 is responding. During the playing, a user may also send a PAUSE command to source 106. The pause command is a command that tells source 106 to pause the streaming content.

In step 706, statistics for the delivery may be intercepted, if available. For example, device 102 sends a SET PARAMETER request that contains player statistics for the streaming content. The statistics may indicate a quality of service, such as the bit rate that the video was sent at, the resolution, etc.

In step 708, a tear down request is sent to close the connection with source 106. The tear down request is a request that ends the session.

In step 710, the setup, play/pause, delivery statistics, and tear down commands are interpreted to terminate delivery status. For example, a command interpreter 502 may determine that the commands sent between device 102 and source 106 proceeded in a correct way. For example, they evolved from set up to play/pause, to tear down. If no error messages are intercepted during that sequence, the delivery may be considered successful.

However, if the session fails at a setup or play stage, then command interpreter 502 may indicate that the delivery was not successful. For example, a play command may never be intercepted by command interpreter 502. Thus, it may indicate that the streaming delivery of content was not started. Also, an error message may be received during the setup and the play/pause, and tear down commands are not intercepted. In this case, the delivery status may be considered unsuccessful.

Embodiments of the present invention provide many advantages. For example, from a billing standpoint, it may not be clear whether the delivery of content should be considered successful or not. Content delivery services often do not explicitly state that a delivery of content was successful or not from a billing standpoint. For example, error messages may be received during the delivery but that may not mean the delivery of content should be billed. Also, there may be other factors that may not be flagged by a content provider but may cause the delivery to be considered unsuccessful. For example, a slow bit rate may be considered an unsuccessful delivery.

By intercepting commands sent between a device and content provider, a better understanding of whether the content delivery was successful or not can be determined. This allows for better customer service. Unsuccessful deliveries may not be charged or charges may be reversed. Thus, a user does not need to affirmatively contact the content delivery service to have the billing charges reversed.

Recommendations and Personalization Engine

Platform 104 can initiate personalized campaigns, marketing, sales initiatives, and recommendations based on user preferences, past history of usage, category of content, context, and preferred interest. These initiatives will be referred to recommendations hereafter but it should be understood that the recommendations may be used in providing any initiatives mentioned above or appreciated by a person skilled in the art.

Platform 104 may receive content owned by other sources 106. Accordingly, limited information may be known about the content because it is not owned by platform 104. Also, content may be too new (e.g. news or live) to have accumulated any pattern/information on the content. Using embodiments of the present invention, personalization and recommendations can be provided for content that platform 104 does not own and content that is new based on the information stored by platform 104.

Figure 8:
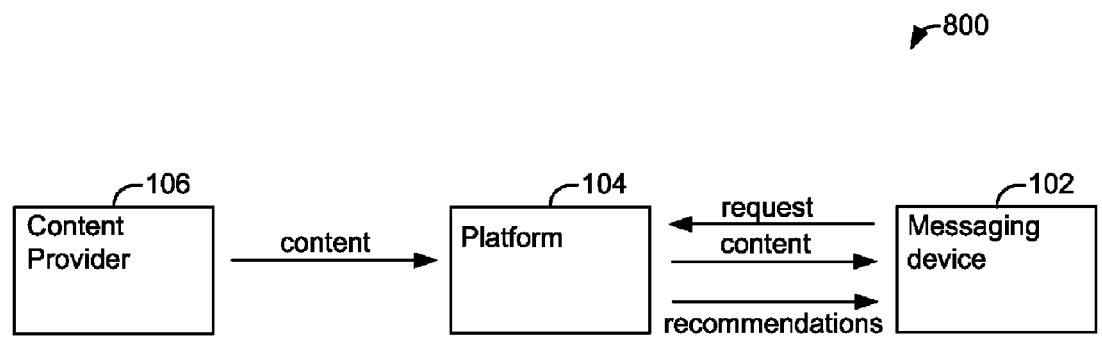
FIG. 8 depicts a system for providing recommendations for content according to one embodiment of the present invention.

FIG. 8 depicts a system 800 for providing recommendations for content according to one embodiment of the present invention. System 800 may be provided in system 100 where platform 104 is used to provide content and recommendations to access device 102 for source 106. It will be recognized, however, that platform 104 may be used in other systems. For example, platform 104 may provide content to a user's computer through the Internet, or provide content through the network on demand to a user's television, etc. Thus, content can be provided to devices other than access devices 102.

Source 106 in this embodiment provides content to platform 104. The content provided may be owned by source 106. For example, source 106 may maintain the content. Additionally, it will be recognized that source 106 may also retrieve content from other sources. Although a single source 106 is shown, it will be recognized that there may be multiple sources 106.

Platform 104 may be owned by a service provider. In one embodiment, platform 104 may provide content that is not owned by the service provider that owns platform 104. For example, platform 104 may be an aggregator that aggregates content from multiple sources 106. Content that is not owned by platform 104 may mean that the content is maintained by an entity outside platform 104, such as a source 106. Also, content not owned may be content that is uploaded to platform 104 by source 106. Platform 104 may store the content but no usage history or very little usage history applies because the new content has just been uploaded to platform 104. This is the same for new content (e.g. news broadcasts) or live content. Accordingly, platform 104 may not know much or anything about the content uploaded or provided by source 106.

Access devices 102 may be any of the devices that can request content from platform 104. In one embodiment, access device 102 may be associated with a user account from which a user lists downloads of content.

Access device 102 is configured to send a request to platform 104. If platform 104 has already uploaded the content from source 106, the content can be provided to access device 102. If the content is not uploaded on platform 104, then platform 104 may use a pointer to the content (as part of the metadata that has been uploaded by the content provider) and uses the pointer to contact source 106 in order to receive the content from source 106 or redirect the request from access device 102 to that content (typically in proxy mode to mask the URL of the real content). The content may then be sent from source 106 to access device 102 (possibly through platform 104). Any method may be used to send the content, such as streaming, downloading, pushing, etc.

In one embodiment, a menu of possible content may be provided to access device 102. When actions are taken, such as when content is browsed or purchased, additional/updated recommendations may be provided to the user of access device 102. In one embodiment, the recommendations may be for new content not owned by platform 104.

Figure 9:
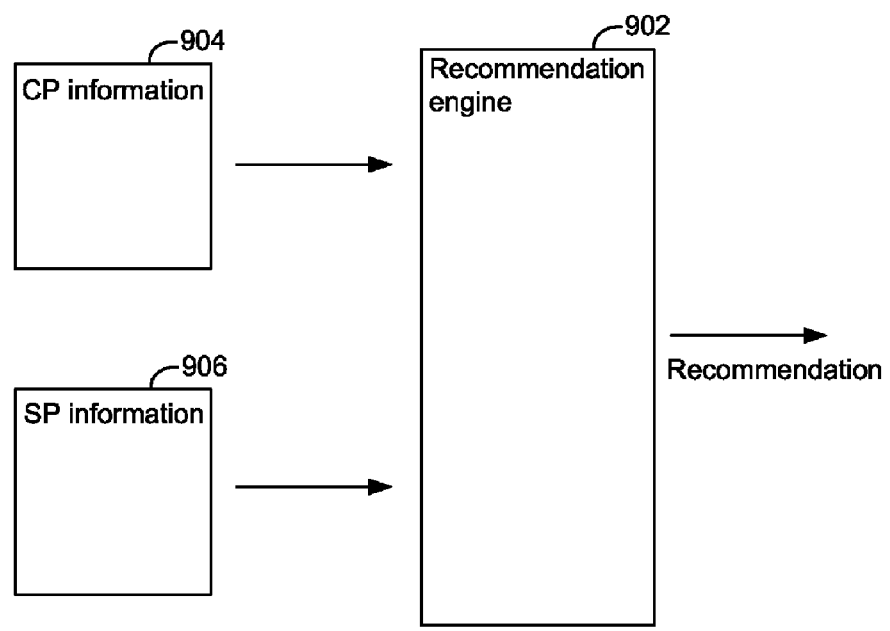
FIG. 9 depicts an example of information used in order to provide a recommendation according to one embodiment of the present invention.

FIG. 9 depicts an example of information used in order to provide a recommendation according to one embodiment of the present invention. As shown, a recommendation engine 902 uses source information 904 provided from source 106 and service provider information 906 that is associated with platform 104. Although source information 904 and service provider information 906 are shown, it will be understood that recommendation engine 902 may use other information.

Source information 904 may be any information that is provided by source 106. For example, source information may include a description of the content (e.g., a summary of the name/title/source/author), keywords associated with the content, categories for the content, target demographics, cost/condition of usage, recommendations determined by the source 106, etc.

The keywords associated with the content may include any keywords that describe the content. The keywords may overlap with the description of the content. For example, if the content includes a sports game between the Jets and Giants, the keywords may include "football", "Jets", "Giants", "NFL".

Categories for the content include the kind of content, such as the data type (e.g., MP3, Windows Media format), the genre of the content (e.g., sports, horror movie), etc. Other categories will be appreciated by a person skilled in the art.

The target demographics may be what the source 106 understands the target to be. For example, the target may be teenagers, adults, children, etc.

The cost and condition of usage may be how much the content should cost. The condition of usage may be digital rights management terms, and other recommendations like age requirements.

The recommendations provided may also be pointers to other content. For example, source 106 may include result of data mining analyses performed on its side or based on its own recommendation algorithms strategies that the content provider uses to provide pointers to the other content. These pointers point to content owned by the content provider and platform 104 is configured to use the pointers to link to other content that may be provided by other content providers (because platform 104 provides content from many sources 104). Using information in platform 104, the content provider may be able to access enough business intelligence data to be able to add some information about content from other sources 106 and refine its initial recommendations that it provides as meta data to the service provider when uploading it.

Additionally, other statistics, such as patterns, (pattern frequencies, etc.) that may be used in order to generate recommendations may be provided.

Service provider information 906 may be any information that is generated by the service provider (platform 104) via recommendation engines (e.g. online bookstores), data mining, etc. in real time or based on batch processing. For example, platform 104 may aggregate content from a variety of sources 106. This content may be similar to the content that is being provided to access device 102. The statistics associated with the other content may be used to provide recommendations for the new content. Additionally, service provider information 906 may use user preferences, the past history of a user, prior categorizations by the same source 106, etc. This information may be information typically hidden from the content provider for privacy, regulation, or business reasons (i.e. to maintain the relationship with the user instead of letting the content provider know the information). This is because platform 104 is used to aggregate content from many sources 106 and is the contact to access device 102 instead of source 106. In one embodiment, service provider information 906 does not include information on the new content received from source 106.

Recommendation engine 902 uses source information 904 and service provider information 906 in order to generate a model. The model may be generated using information provided by source 106. For example, the source information 904 may be provided as metadata by all sources 106 that send content to platform 104. Source information 904 may be in an expected or pre-determined format that can be processed by recommendation engine 902. Recommendation engine 902 can then determine which metadata should be used to generate the model. For example, for some content, certain fields of metadata or categories of metadata may be more appropriate or desirable. Thus, recommendation engine 902 is not restricted to the information that is being used by an outside source 106.

The models may be generated based on statistical optimizations (e.g., likelihood maximization, entropy maximization, expectation maximization (EM) algorithms, data mining, or other algorithms well known in the art. This optimization may use service provider information 906 for other content. For example, statistical estimates (interpolation/extrapolation) of similar content in the content aggregated by platform 104 may be used in the optimization.

The model may then be used to determine recommendations. For example, a conventional recommendation engine may be used to generate the recommendations from the model.

Figure 10:
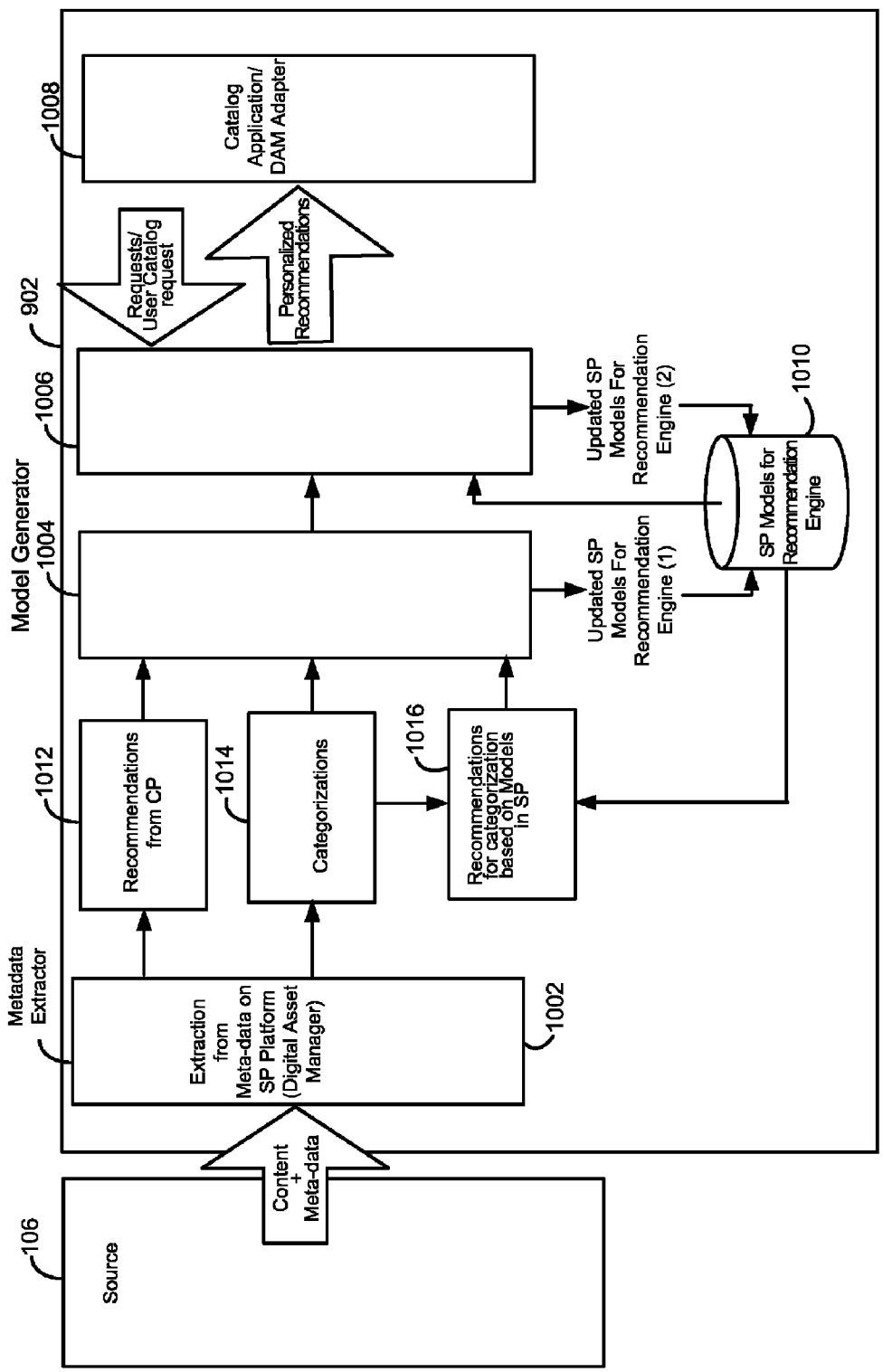
FIG. 10 depicts a recommendation engine according to embodiments of the present invention.

FIG. 10 depicts a more detailed embodiment of recommendation engine 902 according to embodiments of the present invention. As shown, recommendation engine 902 includes a metadata extractor 1002, a model generator 1004, a recommendation processor 1006, and catalog application 1008. Also, a database 1010 for storing the models is provided.

Metadata extractor 1002 is configured to extract the metadata received with the content and to determine how the metadata should be used. For example, metadata may be classified into recommendations from source 106 and/or categorizations from source 106. The recommendations include any recommendations that are provided by source 106. For example, recommendations may include hints of information of the content that are related to the type of content provided. The categories can be any categories that are provided by source 106. For example, categories may include sports, news, multimedia, etc.

Recommendations for the categories may also be provided based on models in forms associated with platform 104. For example, platform 104 may include content that is associated with the same category for the new content. Those recommendations may be associated with the new content.

The recommendations from a source 106, the categorizations, and recommendations for the categorizations based on the models of platform 104 are provided to model generator 1004. Model generator 1004 is then configured to generate a model. The model may be generated using any well-known method of generating a model. For example, selected information from the three inputs may be used to generate a model for the new content. The model is then stored in database 1010. The models may be generated using data mining techniques known in the art.

Recommendation processor 1006 may then use the model in order to provide recommendations. Recommendation processor 1006 may in addition add user preferences and/or the prior user history in order to generate the recommendations for the model. In this way, the recommendations are then personalized. The personalized recommendations are sent to catalog application 222.

The model may be iteratively updated as more information is determined. For example, the content may be requested by other users and their preferences (or other content downloaded) may be used to update the model. Updated models may be used in order to provide recommendations when additional requests for the new data are made. A person skilled in the art may appreciate how to provide recommendations based on the models.

The recommendations that may be provided to a user may include a menu that proposes other content that a user can purchase and download. For example, a menu may indicate that this content may be pertinent to the content purchased.

Accordingly, using embodiments of the present invention, recommendations may be provided to users for content that may not be owned by platform 104. Instead of just using a user's preferences and prior history, information about the content may be used. A system of predefined metadata may be processed in order to generate a model from which a recommendation engine can produce recommendations. Accordingly, information from metadata from content owned by source 106 can be used to generate a model that is used by the recommendation engine. Accordingly, platform 104 may provide personalized recommendations for content owned by another entity.

Also, with respect to live data and news (new data), the recommendations of the content providers may not be useful because the data is too new to provide helpful recommendations. However, the categorization and past history known by the service provider for a category of the new data may be used to predict that particular new content like scores of a football game have a lot of value and should be recommended to male users etc.

Digital Rights Management

Digital rights management may be provided by platform 104. For example, rights to content may be provided using a forward lock mechanism. In this mechanism, content may be played only at a download terminal. Thus, forwarding of the content may not be enabled.

A combined delivery mechanism may be provided where content and rights are delivered together. The contents may be played according to the associated rights delivered to the download terminal. These rights may prevent forwarding or may allow a user to forward the content.

A separate delivery may also be provided where content is encrypted and a device 102 can acquire the right and decrypt the content using a key. The content can then be played according to the rights, such as content may be played once, a limited number of times, etc.

Platform 104 may also provide public key encryption for protecting symmetric keys using the encrypted content, digital certificates or cryptographic digest bases schemes to ensure content integrity, device authentication, and rights based on DRM 2.0's right expression language (REL) which is a subset of ODRL.

A rights management server may provide rights to a user. A package that may provide strong encryption algorithms in a secured container technology to prevent unauthorized distribution of the content may be provided. Media content and associated business rules may be supported separately.

A DRM license server may be provided to manage, authorize and report content transactions and verify content licensing requests and issue content licenses to trusted clients. A DRM client is able to download and stream playback of secured formats in a temporary assisted environment based on usage rules specified by content owners.

Figure 11:
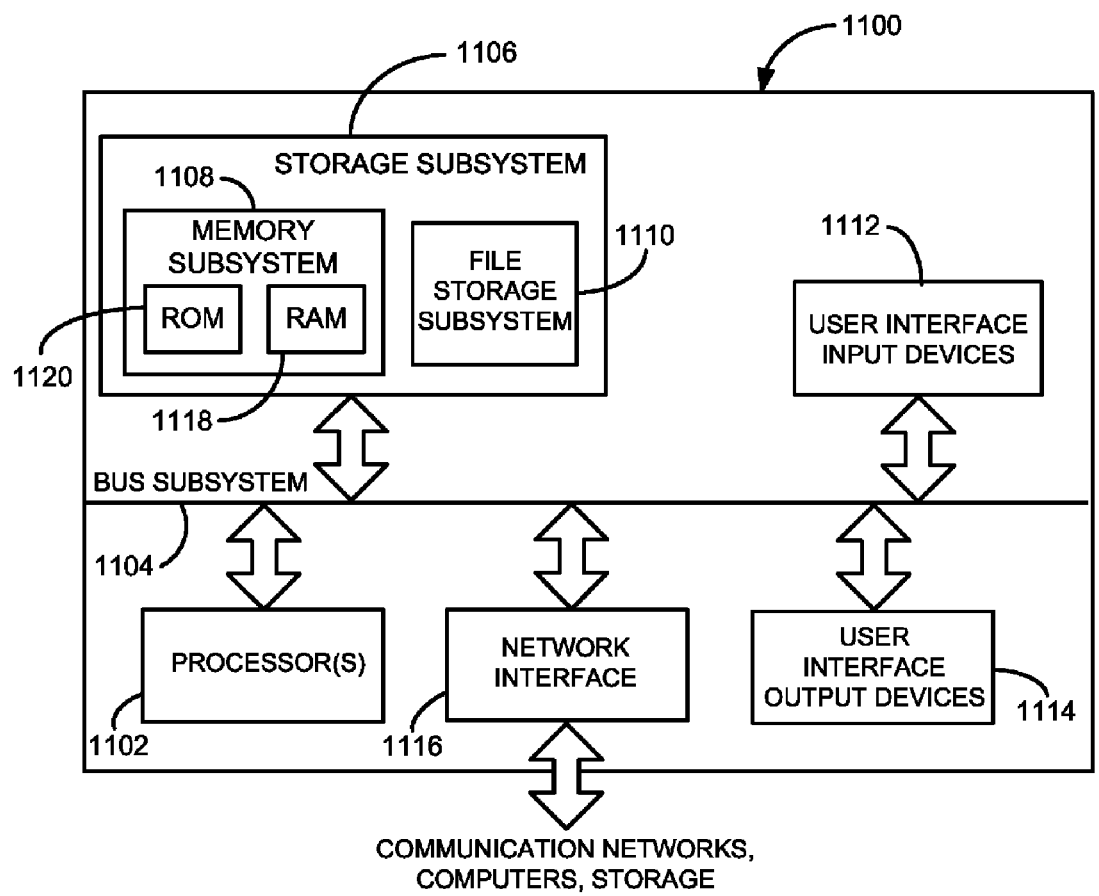
FIG. 11 is a simplified block diagram of data processing system that may be used to perform processing according to an embodiment of the present invention.

FIG. 11 is a simplified block diagram of data processing system 1100 that may be used to perform processing according to an embodiment of the present invention. As shown in FIG. 11, data processing system 1100 includes at least one processor 1102, which communicates with a number of peripheral devices via a bus subsystem 1104. These peripheral devices may include a storage subsystem 1106, comprising a memory subsystem 1108 and a file storage subsystem 1110, user interface input devices 1112, user interface output devices 1114, and a network interface subsystem 1116. The input and output devices allow user interaction with data processing system 1100.

Network interface subsystem 1116 provides an interface to other computer systems, networks, and storage resources. The networks may include the Internet, a local area network (LAN), a wide area network (WAN), a wireless network, an intranet, a private network, a public network, a switched network, or any other suitable communication network. Network interface subsystem 1116 serves as an interface for receiving data from other sources and for transmitting data to other sources from data processing system 1100. Embodiments of network interface subsystem 1116 include an Ethernet card, a modem (telephone, satellite, cable, ISDN, etc.), (asynchronous) digital subscriber line (DSL) units, and the like.

User interface input devices 1112 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information to data processing system 1100.

User interface output devices 1114 may include a display subsystem, a printer, a fax machine, or non-visual displays such as audio output devices. The display subsystem may be a cathode ray tube (CRT), a flat-panel device such as a liquid crystal display (LCD), or a projection device. In general, use of the term "output device" is intended to include all possible types of devices and ways to output information from data processing system 1100.

Storage subsystem 1106 may be configured to store the basic programming and data constructs that provide the functionality of the present invention. For example, according to an embodiment of the present invention, software modules implementing the functionality of the present invention may be stored in storage subsystem 1106. These software modules may be executed by processor(s) 1102. Storage subsystem 1106 may also provide a repository for storing data used in accordance with the present invention. Storage subsystem 1106 may comprise memory subsystem 1108 and file/disk storage subsystem 1110.

Memory subsystem 1108 may include a number of memories including a main random access memory (RAM) 1118 for storage of instructions and data during program execution and a read only memory (ROM) 1120 in which fixed instructions are stored. File storage subsystem 1110 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Bus subsystem 1104 provides a mechanism for letting the various components and subsystems of data processing system 1100 communicate with each other as intended. Although bus subsystem 1104 is shown schematically as a single bus, alternative embodiments of the bus subsystem may utilize multiple busses.

Data processing system 1100 can be of varying types including a personal computer, a portable computer, a workstation, a network computer, a mainframe, a kiosk, or any other data processing system. Due to the ever-changing nature of computers and networks, the description of data processing system 1100 depicted in FIG. 11 is intended only as a specific example for purposes of illustrating the preferred embodiment of the computer system. Many other configurations having more or fewer components than the system depicted in FIG. 11 are possible.

The present invention can be implemented in the form of control logic in software or hardware or a combination of both. The control logic may be stored in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A platform for managing delivery of web and multimedia content originating from one or more content providers to users for one or more of: browsing, consumption, or purchase, the platform comprising:

one or more processors operatively coupled to at least one memory, the at least one memory including instructions that, when executed by the one or more processors, provide:

a portal that supports access to an access device through a plurality of access channels configured to receive requests into the at least one memory through one or more of the access channels, wherein a request for content is received from an access device through an access channel in the plurality of access channels, wherein each of the plurality of access channels comprises an access channel type;

an identity management module configured to determine a user associated with the request, store information about access devices used by the user, provide the information about access devices used by the user to the platform;

a content manager configured to manage content for delivery through the plurality of access channels and configured to determine eligible content for the user using the stored information about the access devices used by the user, wherein the content for delivery through the plurality of access channels comprises one or more of the following: content included in a catalog, recommended content, sample content, or channel specific content, and wherein the content manager is further configured to upload content and metadata associated with the uploaded content to describe the uploaded content, wherein the access device is configured to receive content through that access device's plurality of access channels each having an associated channel type, wherein the content manager is further configured to determine a content type of the requested content, and based on the determined content type of the requested content, deliver the requested content through the access channel of the access device with the access channel type which is compatible with the content type of the requested content; and a service provider including a billing module configured to process billing for the user and content provider based on the eligible content for the user through the plurality of access channels, to provide server level charging for content purchased by the platform, and to provide for billing and revenue management by the service provider, wherein the content manager is configured to intercept commands sent between the access device and the service provider, analyze the commands to determine a delivery status at least by comparing the order and timing of the intercepted commands with a pattern of previous commands in the stored information about the access devices used by the user in the identity management module, determine that based on the delivery status that delivery is designated by a degree of success including: successful, unsuccessful, or partially successful; and in response to the delivery status, direct the billing module to initiate a billing action which corresponds to the degree of success, determine the eligible content which comprises content which is adapted for the channel being used, wherein the delivery status further includes information about the eligible content which comprises quality of service and success of delivery of the eligible content, and wherein the billing module is further configured to access the delivery status information to determine a billing amount based on at least quality of service and success of delivery of the eligible content.

2. The platform of claim 1, wherein the content manager is configured to determine eligible content for the user based on search criteria, the search criteria including price, category of the content, type of subscription for the user, a date uploaded for the content, a relationship to other content downloaded by the user, or purchase and download patterns of other users.

3. The platform of claim 1, wherein the content manager collects statistics of the content provided to the user, wherein the statistics comprise the content usage and/or purchase statistics.

4. The platform of claim 1, wherein content is adapted to the access channel of the access device.

5. The platform of claim 1, wherein the identity management module stores information in the at least one memory comprising previous purchases of the user, subscription information for the user, or purchase patterns to be used to determine the eligible content.

6. The platform of claim 1, wherein at least a part of the content provided to the user's access device is hosted or uploaded by the content provider.

7. The platform of claim 1, further comprising instructions that, when executed by the one or more processors, provide a menu generator in the at least one memory configured to generate a menu for display on the user's device, the menu displaying the eligible content for the user, wherein the eligible content comprises a catalog of content that is available for purchase by the user.

8. The platform of claim 7, wherein the content includes a URI, the URI causing the content to be provided to the user's access device, wherein the URI is a pointer referencing the content.

9. The platform of claim 8, wherein the URI is encrypted and passed to a proxy from the portal, wherein the URI is decrypted and used to determine the content requested.

10. The platform of claim 7, wherein the menu includes an address, the address when sent to the platform causing the content to be provided to the user's access device.

11. The platform of claim 1, wherein the content manager is configured to provide and manage content that is locally stored.

12. The platform of claim 1, wherein the content manager is configured to provide and manage content that is streamed or pushed from a content provider.

13. The platform of claim 1, wherein the billing module is configured to process billing using a prepaid model.

14. The platform of claim 1, wherein the billing module is configured to process billing using a postpaid model.

15. The platform of claim 1, wherein the billing module is configured to access a checking account of the user for payment of an amount of money, reserve an amount of money for the user for debiting for payment, or bill an amount of money for payment.

16. The platform of claim 1, wherein recommendations are provided to the user based on the content requested.

17. The platform of claim 1, wherein successful comprises complete delivery of the content, unsuccessful comprises no delivery of the content, and partially successful comprises at least some portion of the content being delivered.

18. The platform of claim 1, wherein the commands includes one or more of: set, play, stop, or error command.

19. A method for delivering web and multimedia content originated from one or more content providers to mobile devices communicating through a plurality of channels using a platform for one or more of: browsing, consumption, and purchase, the method comprising:
    determining eligible content for a user based on user preferences and content available through an access channel and stored information about access devices of the user, wherein the eligible content comprises one or more of the following: content included in a catalog, recommended content, sample content, and channel specific content;
    uploading content and metadata associated with the uploaded content to describe the uploaded content;
    providing the information about access devices of the user;
    sending a list of the eligible content to the user's access device through the access channel;
    receiving a request for content through an access channel in a plurality of access channels, wherein the content request includes a URI, the URI causing the content to be provided to the user's access device, wherein the URI is a pointer referencing the content and the URI is encrypted and passed to a proxy from the portal where the URI is decrypted and used to determine the requested content;
    determining a content type of the requested content;
    based on the determined content type of the requested content, delivering the requested content through an access channel of the user's access device with the access channel type which is compatible with the content type of the requested content, wherein the content type is adapted for the determined channel being;
    intercepting commands sent between the access device and the service provider;
    analyzing the commands to determine a delivery status at least by comparing the order and timing of the intercepted commands with a pattern of previous commands in the information about the access devices of the user;
    determining that based on the delivery status that delivery is designated by a degree of success including: successful, unsuccessful, or partially successful;
    in response to the delivery status, directing the billing module to initiate a billing action which corresponds to the degree of success, wherein the delivery status further includes information about the requested content which comprises quality of service and success of delivery of the requested content;
    accessing the delivery status information to determine a billing amount based on at least quality of service and success of delivery of the requested content; and
    billing the user based on the content provided to the user and charging the billing amount for content purchased by the platform.

20. The method of claim 19, wherein the list comprises a pointer to the eligible content.

21. The method of claim 20, wherein the pointer is received from the access device as the request for content and is used to determine the requested content.

22. The method of claim 19, wherein the content provided is locally stored or stored at the content provider.

23. The method of claim 19, wherein content provided is streamed or pushed to the access device.

24. The method of claim 19, wherein billing the user comprises billing the user based on a prepaid model or postpaid model.

25. The method of claim 19, further comprising crediting the user if the delivery is unsuccessful.

26. A platform for delivering content originated from one or more content providers to mobile devices communicating through a plurality of channels, the platform comprising:
    a processor operatively coupled to at least one memory, the at least one memory including instructions that, when executed by the processor, cause the processor to:
    determine eligible content for a user based on user preferences and content available through an access channel and stored information about access devices of the user, wherein the eligible content comprises one or more of the following: content included in a catalog, recommended content, sample content, and channel specific content;
    upload content and metadata associated with the uploaded content to describe the uploaded content;
    provide the information about access devices of the user;
    send a list of the eligible content to the user's access device through the access channel;
    receive a request for content through an access channel in a plurality of access channels;
    determine a content type of the requested content;
    based on the determined content type of the requested content, deliver the requested content through an access channel of the user's access device with the access channel type which is compatible with the content type of the requested content, wherein the content type is adapted for the determined channel being;
    intercept commands sent between the access device and the service provider;
    analyze the commands to determine a delivery status at least by comparing the order and timing of the intercepted commands with a pattern of previous commands in the information about the access devices of the user;
    determine that based on the delivery status that delivery is designated by a degree of success including: successful, unsuccessful, or partially successful;
    in response to the delivery status, direct the billing module to initiate a billing action which corresponds to the degree of success, wherein the delivery status further includes information about the requested content which comprises quality of service and success of delivery of the requested content;
access the delivery status information to determine a billing amount based on at least quality of service and success of delivery of the requested content;
bill the user based on the content provided to the user and charging the billing amount for content purchased by the platform; and
credit the user if the delivery is unsuccessful.

27. A method for delivering content originated from one or more content providers to devices communicating through a plurality of channels, the method comprising:
determining eligible content for a user based on user preferences and content available through an access channel and stored information about access devices of the user;
providing the information about access devices of the user;
sending a list of the eligible content to the user's access device through the access channel;
receiving a request for content through an access channel in a plurality of access channels, wherein the content request includes a URI, the URI causing the content to be provided to the user's access device;
determining a content type of the requested content;
based on the determined content type of the requested content, delivering the requested content through an access channel of the user's access device with the access channel type which is compatible with the content type of the requested content;
intercepting commands sent between the access device and the service provider;
analyzing the commands to determine a delivery status at least by comparing the order and timing of the intercepted commands with a pattern of previous commands in the information about the access devices of the user;
in response to the delivery status, directing the billing module to initiate a billing action which corresponds to the delivery status, wherein the delivery status comprises a quality of service and a success of delivery of the requested content; and
billing the user based on the content provided to the user and charging a billing amount for content.

28. The method of claim 27, wherein the delivery status further includes information about the requested content which comprises quality of service and success of delivery of the requested content.

29. The method of claim 27, wherein the eligible content comprises one or more of the following: content included in a catalog, recommended content, sample content, or channel specific content.

30. The method of claim 27, wherein billing the user is based on a prepaid model or postpaid model, and crediting the user if the delivery is unsuccessful.

31. A non-transitory computer-readable medium having sets of instructions stored thereon which, when executed by a computer, cause the computer to:
determine eligible content for a user based on user preferences and content available through an access channel and stored information about access devices of the user;
provide the information about access devices of the user;
send a list of the eligible content to the user's access device through the access channel;
receive a request for content through an access channel in a plurality of access channels, wherein the content request includes a URI, the URI causing the content to be provided to the user's access device;
determine a content type of the requested content;
based on the determined content type of the requested content, deliver the requested content through an access channel of the user's access device with the access channel type which is compatible with the content type of the requested content;
intercept commands sent between the access device and the service provider;
analyze the commands to determine a delivery status at least by comparing the order and timing of the intercepted commands with a pattern of previous commands in the information about the access devices of the user;
in response to the delivery status, direct the billing module to initiate a billing action which corresponds to the delivery status, wherein the delivery status comprises a quality of service and a success of delivery of the requested content; and
bill the user based on the content provided to the user and charging a billing amount for content.

32. The non-transitory computer-readable medium of claim 31, wherein the delivery status further includes information about the requested content which comprises quality of service and success of delivery of the requested content.

33. The non-transitory computer-readable medium of claim 31, wherein the eligible content comprises one or more of the following: content included in a catalog, recommended content, sample content, or channel specific content.

34. The non-transitory computer-readable medium of claim 31, wherein billing the user is based on a prepaid model or postpaid model, and crediting the user if the delivery is unsuccessful.

* * * * *

UNITED STATES PATENT AND TRADEMARK OFFICE
CERTIFICATE OF CORRECTION

| | |
|---|---|
| PATENT NO. | : 8,365,306 B2 |
| APPLICATION NO. | : 11/138844 |
| DATED | : January 29, 2013 |
| INVENTOR(S) | : Maes |

Page 1 of 1

It is certified that error appears in the above-identified patent and that said Letters Patent is hereby corrected as shown below:

In the Specification

In column 4, line 56, delete "(e.g.," and insert -- e.g., --, therefor.

In column 4, line 65, delete "a-access" and insert -- access --, therefor.

In column 9, line 43-49, delete "These actions may be interpreted and then.... rules are used to determine if a billing action should be taken." and insert the same on Col. 9, Line 42, after "installed)." as continuation of Paragraph.

Signed and Sealed this
Twenty-fifth Day of August, 2015

Michelle K. Lee
*Director of the United States Patent and Trademark Office*